US012687406B2

(12) United States Patent
Ropel et al.

(10) Patent No.: US 12,687,406 B2
(45) Date of Patent: Jul. 21, 2026

(54) HOME ENERGY MANAGEMENT SYSTEM ON A STICK, CONNECTED TO UTILITY METER

(71) Applicant: Volvo Car Corporation, Gothenburg (SE)

(72) Inventors: Andreas Ropel, Torslanda (SE); Jones Schöld, Hisings Backa (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/799,221

(22) Filed: Aug. 9, 2024

(65) Prior Publication Data

US 2026/0043673 A1 Feb. 12, 2026

(51) Int. Cl.
*G01D 4/00* (2006.01)
*G06Q 50/06* (2024.01)
*H04L 9/40* (2022.01)

(52) U.S. Cl.
CPC ............ *G01D 4/002* (2013.01); *G06Q 50/06* (2013.01); *H04L 63/12* (2013.01); *H04L 63/205* (2013.01); *H04Q 2209/40* (2013.01); *H04Q 2209/60* (2013.01)

(58) Field of Classification Search
CPC .. H04Q 9/00; H04Q 2209/00; H04Q 2209/30; H04Q 2209/40; H04Q 2209/60; H04Q 2209/80; H04Q 2209/84; G01D 4/00; G01D 4/002; G01D 4/008; H04L 63/12; H04L 63/205; G06Q 50/06
See application file for complete search history.

(56) References Cited

U.S. PATENT DOCUMENTS 8,295,990 B2 * 10/2012 Venkatakrishnan ... G06Q 50/06
700/297
8,369,998 B2 2/2013 Drake et al.
8,621,097 B2 12/2013 Venkatakrishnan et al.
(Continued)

FOREIGN PATENT DOCUMENTS

EP 2779361 B1 10/2017
KR 102230787 B1 3/2021
KR 102625322 B1 1/2024

*Primary Examiner* — Franklin D Balseca
(74) *Attorney, Agent, or Firm* — Davé Law Group, LLC; Raj S. Davé

(57) ABSTRACT

According to an embodiment, disclosed is a system comprising an energy management module, electrically coupled to a utility meter, energy consuming devices and energy producing devices, comprising, a communication module configured to receive input energy data from utility meter, and energy information of energy consuming devices and energy producing devices; a processor storing instructions in a non-transitory memory that, when executed, cause the processor to: determine energy consumption data of the devices; identify a first device based on a first set of predefined priority values which requires energy; identify a second device based on a second set of predefined priority values which has excess energy; establish a connection and control energy transfer from the second device to the first device based on the energy consumption data and the input energy data to enable smart scheduling and power optimization among the energy consuming devices and the energy producing devices.

20 Claims, 9 Drawing Sheets

(56)  References Cited

U.S. PATENT DOCUMENTS

| | | | |
|---|---|---|---|
| 8,930,037 B2 * | 1/2015 | Brian | ................. G06Q 30/0283 |
| | | | 700/297 |
| 9,124,098 B2 * | 9/2015 | Broniak | ............ H02J 13/00017 |
| 9,639,506 B2 | 5/2017 | Putrevu et al. | |
| 9,817,375 B2 | 11/2017 | Li et al. | |
| 9,927,819 B2 | 3/2018 | Kolavennu | |
| 10,218,530 B2 | 2/2019 | Tappeiner | |
| 10,913,374 B2 | 2/2021 | Son et al. | |
| 11,715,952 B2 | 8/2023 | Gokhale et al. | |
| 2016/0081127 A1 | 3/2016 | Lee et al. | |
| 2023/0219455 A1 | 7/2023 | Salter et al. | |

* cited by examiner

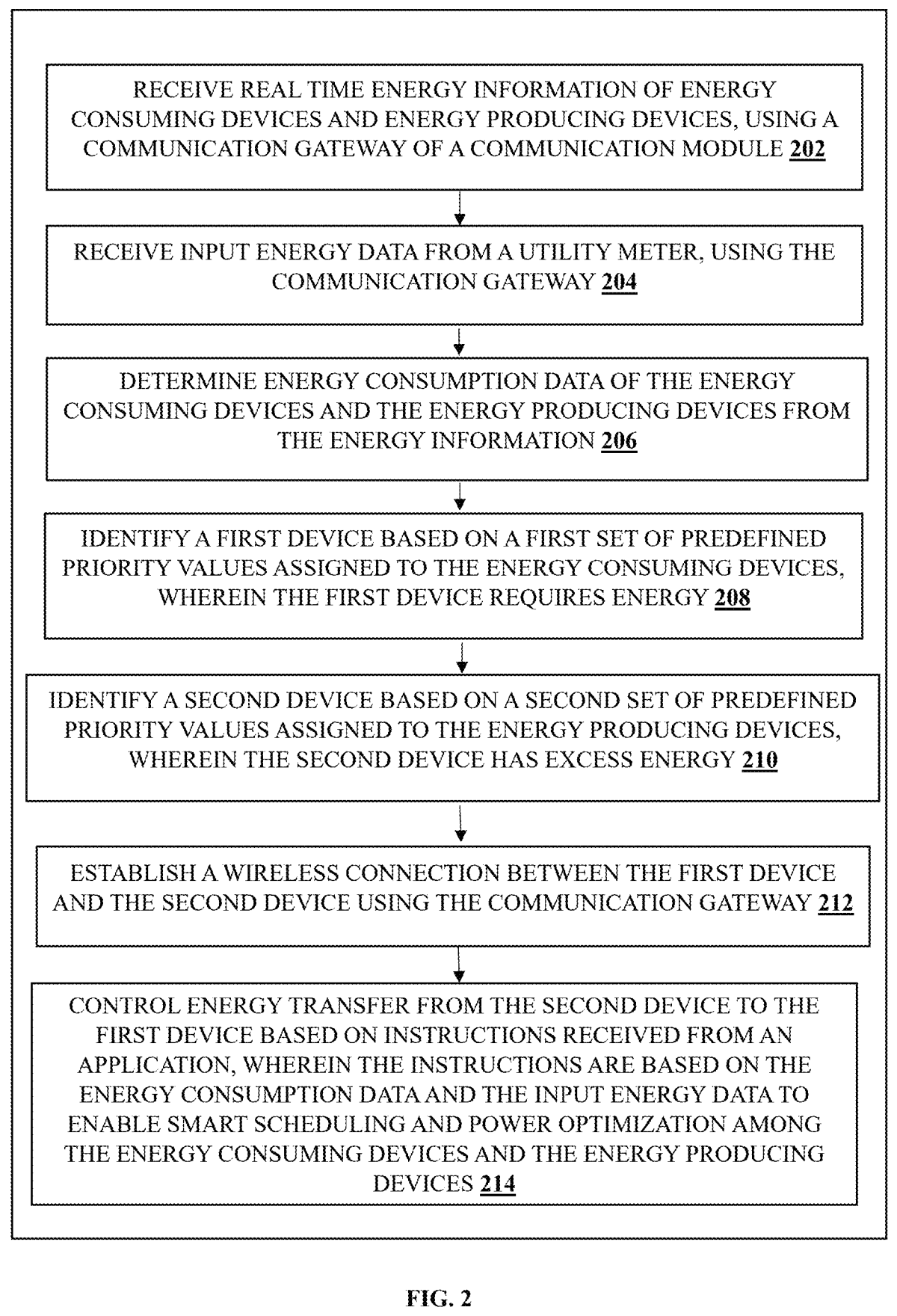

RECEIVE REAL TIME ENERGY INFORMATION OF ENERGY CONSUMING DEVICES AND ENERGY PRODUCING DEVICES, USING A COMMUNICATION GATEWAY OF A COMMUNICATION MODULE 202

RECEIVE INPUT ENERGY DATA FROM A UTILITY METER, USING THE COMMUNICATION GATEWAY 204

DETERMINE ENERGY CONSUMPTION DATA OF THE ENERGY CONSUMING DEVICES AND THE ENERGY PRODUCING DEVICES FROM THE ENERGY INFORMATION 206

IDENTIFY A FIRST DEVICE BASED ON A FIRST SET OF PREDEFINED PRIORITY VALUES ASSIGNED TO THE ENERGY CONSUMING DEVICES, WHEREIN THE FIRST DEVICE REQUIRES ENERGY 208

IDENTIFY A SECOND DEVICE BASED ON A SECOND SET OF PREDEFINED PRIORITY VALUES ASSIGNED TO THE ENERGY PRODUCING DEVICES, WHEREIN THE SECOND DEVICE HAS EXCESS ENERGY 210

ESTABLISH A WIRELESS CONNECTION BETWEEN THE FIRST DEVICE AND THE SECOND DEVICE USING THE COMMUNICATION GATEWAY 212

CONTROL ENERGY TRANSFER FROM THE SECOND DEVICE TO THE FIRST DEVICE BASED ON INSTRUCTIONS RECEIVED FROM AN APPLICATION, WHEREIN THE INSTRUCTIONS ARE BASED ON THE ENERGY CONSUMPTION DATA AND THE INPUT ENERGY DATA TO ENABLE SMART SCHEDULING AND POWER OPTIMIZATION AMONG THE ENERGY CONSUMING DEVICES AND THE ENERGY PRODUCING DEVICES 214

FIG. 2

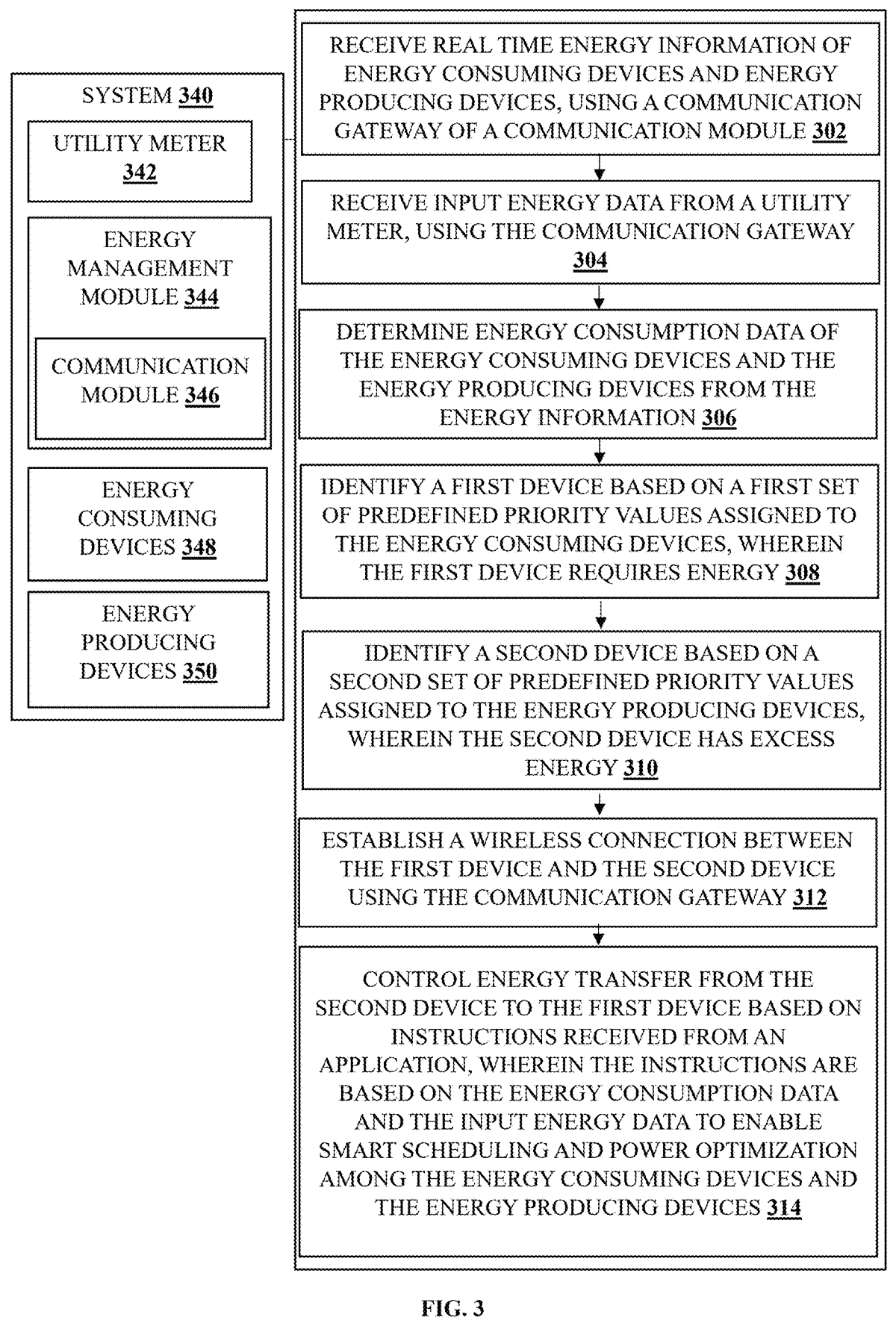

SYSTEM 340

UTILITY METER 342

ENERGY MANAGEMENT MODULE 344

COMMUNICATION MODULE 346

ENERGY CONSUMING DEVICES 348

ENERGY PRODUCING DEVICES 350

RECEIVE REAL TIME ENERGY INFORMATION OF ENERGY CONSUMING DEVICES AND ENERGY PRODUCING DEVICES, USING A COMMUNICATION GATEWAY OF A COMMUNICATION MODULE 302

↓

RECEIVE INPUT ENERGY DATA FROM A UTILITY METER, USING THE COMMUNICATION GATEWAY 304

↓

DETERMINE ENERGY CONSUMPTION DATA OF THE ENERGY CONSUMING DEVICES AND THE ENERGY PRODUCING DEVICES FROM THE ENERGY INFORMATION 306

↓

IDENTIFY A FIRST DEVICE BASED ON A FIRST SET OF PREDEFINED PRIORITY VALUES ASSIGNED TO THE ENERGY CONSUMING DEVICES, WHEREIN THE FIRST DEVICE REQUIRES ENERGY 308

↓

IDENTIFY A SECOND DEVICE BASED ON A SECOND SET OF PREDEFINED PRIORITY VALUES ASSIGNED TO THE ENERGY PRODUCING DEVICES, WHEREIN THE SECOND DEVICE HAS EXCESS ENERGY 310

↓

ESTABLISH A WIRELESS CONNECTION BETWEEN THE FIRST DEVICE AND THE SECOND DEVICE USING THE COMMUNICATION GATEWAY 312

↓

CONTROL ENERGY TRANSFER FROM THE SECOND DEVICE TO THE FIRST DEVICE BASED ON INSTRUCTIONS RECEIVED FROM AN APPLICATION, WHEREIN THE INSTRUCTIONS ARE BASED ON THE ENERGY CONSUMPTION DATA AND THE INPUT ENERGY DATA TO ENABLE SMART SCHEDULING AND POWER OPTIMIZATION AMONG THE ENERGY CONSUMING DEVICES AND THE ENERGY PRODUCING DEVICES 314

FIG. 3

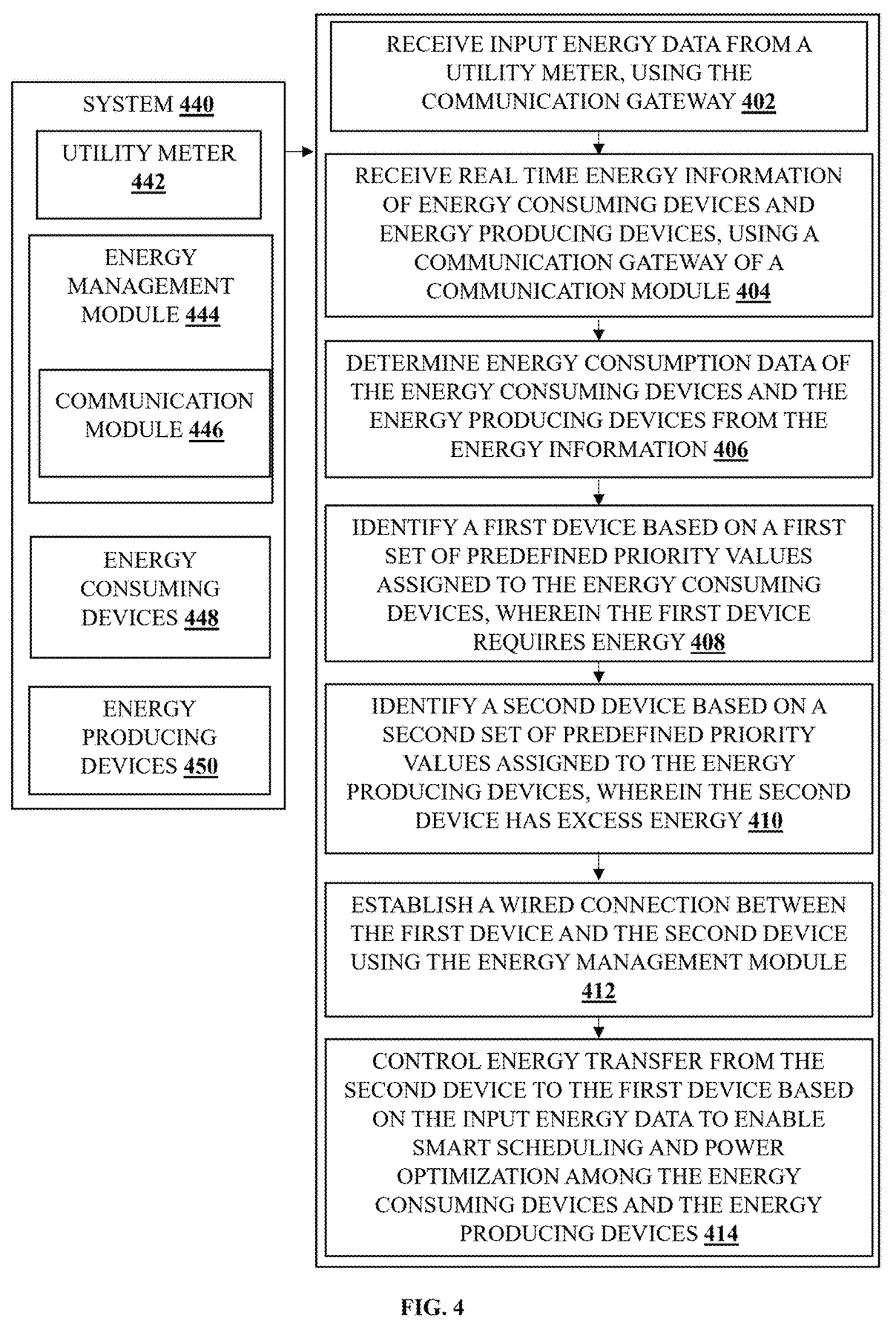

SYSTEM 440

UTILITY METER
442

ENERGY
MANAGEMENT
MODULE 444

COMMUNICATION
MODULE 446

ENERGY
CONSUMING
DEVICES 448

ENERGY
PRODUCING
DEVICES 450

RECEIVE INPUT ENERGY DATA FROM A UTILITY METER, USING THE COMMUNICATION GATEWAY 402

RECEIVE REAL TIME ENERGY INFORMATION OF ENERGY CONSUMING DEVICES AND ENERGY PRODUCING DEVICES, USING A COMMUNICATION GATEWAY OF A COMMUNICATION MODULE 404

DETERMINE ENERGY CONSUMPTION DATA OF THE ENERGY CONSUMING DEVICES AND THE ENERGY PRODUCING DEVICES FROM THE ENERGY INFORMATION 406

IDENTIFY A FIRST DEVICE BASED ON A FIRST SET OF PREDEFINED PRIORITY VALUES ASSIGNED TO THE ENERGY CONSUMING DEVICES, WHEREIN THE FIRST DEVICE REQUIRES ENERGY 408

IDENTIFY A SECOND DEVICE BASED ON A SECOND SET OF PREDEFINED PRIORITY VALUES ASSIGNED TO THE ENERGY PRODUCING DEVICES, WHEREIN THE SECOND DEVICE HAS EXCESS ENERGY 410

ESTABLISH A WIRED CONNECTION BETWEEN THE FIRST DEVICE AND THE SECOND DEVICE USING THE ENERGY MANAGEMENT MODULE 412

CONTROL ENERGY TRANSFER FROM THE SECOND DEVICE TO THE FIRST DEVICE BASED ON THE INPUT ENERGY DATA TO ENABLE SMART SCHEDULING AND POWER OPTIMIZATION AMONG THE ENERGY CONSUMING DEVICES AND THE ENERGY PRODUCING DEVICES 414

FIG. 4

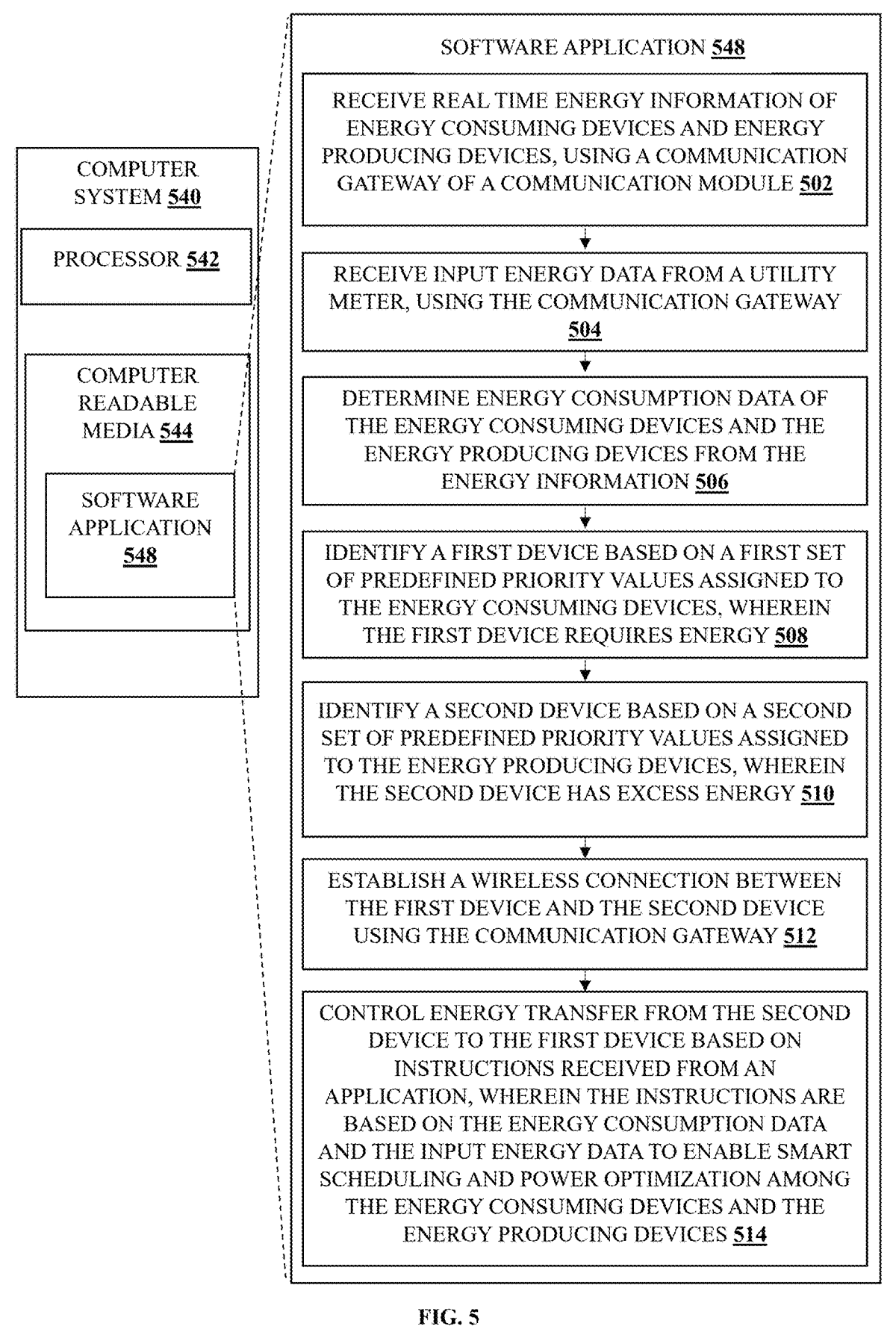

SOFTWARE APPLICATION 548

RECEIVE REAL TIME ENERGY INFORMATION OF ENERGY CONSUMING DEVICES AND ENERGY PRODUCING DEVICES, USING A COMMUNICATION GATEWAY OF A COMMUNICATION MODULE 502

RECEIVE INPUT ENERGY DATA FROM A UTILITY METER, USING THE COMMUNICATION GATEWAY 504

DETERMINE ENERGY CONSUMPTION DATA OF THE ENERGY CONSUMING DEVICES AND THE ENERGY PRODUCING DEVICES FROM THE ENERGY INFORMATION 506

IDENTIFY A FIRST DEVICE BASED ON A FIRST SET OF PREDEFINED PRIORITY VALUES ASSIGNED TO THE ENERGY CONSUMING DEVICES, WHEREIN THE FIRST DEVICE REQUIRES ENERGY 508

IDENTIFY A SECOND DEVICE BASED ON A SECOND SET OF PREDEFINED PRIORITY VALUES ASSIGNED TO THE ENERGY PRODUCING DEVICES, WHEREIN THE SECOND DEVICE HAS EXCESS ENERGY 510

ESTABLISH A WIRELESS CONNECTION BETWEEN THE FIRST DEVICE AND THE SECOND DEVICE USING THE COMMUNICATION GATEWAY 512

CONTROL ENERGY TRANSFER FROM THE SECOND DEVICE TO THE FIRST DEVICE BASED ON INSTRUCTIONS RECEIVED FROM AN APPLICATION, WHEREIN THE INSTRUCTIONS ARE BASED ON THE ENERGY CONSUMPTION DATA AND THE INPUT ENERGY DATA TO ENABLE SMART SCHEDULING AND POWER OPTIMIZATION AMONG THE ENERGY CONSUMING DEVICES AND THE ENERGY PRODUCING DEVICES 514

COMPUTER SYSTEM 540

PROCESSOR 542

COMPUTER READABLE MEDIA 544

SOFTWARE APPLICATION 548

FIG. 5

HOME ENERGY MANAGEMENT SYSTEM ON A STICK, CONNECTED TO UTILITY METER

FIELD OF INVENTION

This disclosure relates to Home Energy Management Systems (HEMS). The disclosure is more particularly concerned with the Home Energy Management System on a stick connected to a utility meter.

BACKGROUND

Increases in energy prices, combined with heightened geopolitical and environmental concerns have resulted in greater interest in energy efficiency. In a pattern consistent with past energy crises, the initial wave of interest has focused on the supply side of the issue, including alternative energy sources (PV, wind, biofuels etc.). With the limitations (including high or extremely high capital costs and established supply chains) of augmenting or disrupting the supply-side becoming apparent, focus should shift to the more easily achievable and more capital efficient demand side through increased efficiency and better utilization of existing resources. [US20090210178A1 published on Aug. 20, 2009]

As the demand for low-carbon society is increasing, the demand side, especially, the optimal use of energy in the household sector, and the measures for energy saving are attracting attention. In the future, the household sector is expected to promote the development of photovoltaic (PV) power generation, storage batteries, fuel cells, etc., and the introduction of power storage devices, and simultaneously, the spread of home appliances with communication functions is expected to advance. [U.S. Pat. No. 10,913,374B2 granted on Feb. 9, 2021]

Therefore, there is a need for a home energy management system that not only connects to household appliances but also to other energy drawing components.

SUMMARY

The following presents a summary to provide a basic understanding of one or more embodiments described herein. This summary is not intended to identify key or critical elements or delineate any scope of the different embodiments and/or any scope of the claims. The sole purpose of the summary is to present some concepts in a simplified form as a prelude to the more detailed description presented herein.

According to an embodiment, disclosed is a system comprising an energy management module, wherein the energy management module is electrically coupled to a utility meter; energy consuming devices and energy producing devices electrically coupled to the energy management module, the energy management module comprising: a communication gateway communicatively coupled to the utility meter, the energy consuming devices, and the energy producing devices; a communication module configured to receive from the communication gateway, input energy data from the utility meter, and energy information of the energy consuming devices and the energy producing devices; a processor storing instructions in a non-transitory memory that, when executed, cause the processor to: determine energy consumption data of the energy consuming devices and the energy producing devices from the energy information; identify a first device based on a first set of predefined priority values assigned to the energy consuming devices, wherein the first device requires energy; identify a second device based on a second set of predefined priority values assigned to the energy producing devices, wherein the second device has excess energy; establish a wireless connection between the first device and the second device using the communication gateway; and control energy transfer from the second device to the first device based on instructions received by the communication module from an application, wherein the instructions are based on the energy consumption data and the input energy data to enable smart scheduling and power optimization among the energy consuming devices and the energy producing devices.

According to an embodiment, disclosed is a system comprising: a utility meter, wherein the utility meter is electrically coupled to power grid; an energy management module, wherein the energy management module is electrically coupled to the utility meter; energy consuming devices and energy producing devices electrically coupled to the energy management module, the energy management module comprising: a communication gateway communicatively coupled to the utility meter, the energy consuming devices and the energy producing devices; a communication module configured to receive from the communication gateway, input energy data from the utility meter, and energy information in real-time, of the energy consuming devices and the energy producing devices electrically coupled to the energy management module; a processor storing instructions in a non-transitory memory that, when executed, cause the processor to: determine energy consumption data of the energy consuming devices and the energy producing devices from the energy information; identify a first device based on a first set of predefined priority values assigned to the energy consuming devices, wherein the first device requires energy; identify a second device based on a second set of predefined priority values assigned to the energy producing devices, wherein the second device has excess energy; establish a wired connection between the first device and the second device using the energy management module; and control energy transfer from the second device to the first device based on the energy consumption data and the input energy data to enable smart scheduling and power optimization among the energy consuming devices and the energy producing devices.

According to an embodiment, disclosed is a method comprising, receiving, real-time energy information of energy consuming devices and energy producing devices, using a communication gateway of a communication module, wherein the energy consuming devices and the energy producing devices are electrically coupled to an energy management module; receiving, input energy data from a utility meter, using the communication gateway, wherein the energy management module is electrically coupled to the utility meter; determining, energy consumption data of the energy consuming devices and the energy producing devices from the energy information; identifying, a first device based on a first set of predefined priority values assigned to the energy consuming devices, wherein the first device requires energy; identifying, a second device based on a second set of predefined priority values assigned to the energy producing devices, wherein the second device has excess energy; establishing, a wireless connection between the first device and the second device using the communication gateway; and controlling, energy transfer from the second device to the first device based on instructions received from an application, wherein the instructions are based on the energy consumption data and the input energy data to enable smart scheduling and power optimization among the energy consuming devices and the energy producing devices.

According to an embodiment, disclosed is a non-transitory computer-readable medium having stored thereon instructions executable by a computer system to perform operations comprising: receiving, real-time energy information of energy consuming devices and energy producing devices from a communication gateway, wherein the energy consuming devices and the energy producing devices are electrically coupled to an energy management module; receiving, input energy data from a utility meter, using the communication gateway, wherein the energy management module is electrically coupled to the utility meter; determining, energy consumption data of the energy consuming devices and the energy producing devices from the energy information; identifying, a first device based on a first set of predefined priority values assigned to the energy consuming devices, wherein the first device requires energy; identifying, a second device based on a second set of predefined priority values assigned to the energy producing devices, wherein the second device has excess energy; establishing, a wireless connection between the first device and the second device using the communication gateway; and controlling, energy transfer from the second device to the first device based on instructions received from a mobile application, wherein the instructions are based on the energy consumption data and the input energy data to enable smart scheduling and power optimization among the energy consuming devices and the energy producing devices.

BRIEF DESCRIPTION OF THE FIGURES

These and other aspects of the present invention will now be described in more detail, with reference to the appended drawings showing exemplary embodiments of the present invention, in which:

FIG. 2 shows a flow diagram for a method according to an embodiment of the present invention.

FIG. 3 shows steps executed by a system according to an embodiment of the present invention.

FIG. 4 shows steps executed by a system according to an embodiment of the present invention.

FIG. 5 shows steps executed by a computer readable media according to an embodiment of the present invention.

DETAILED DESCRIPTION

Definitions and General Techniques

Figure 1:
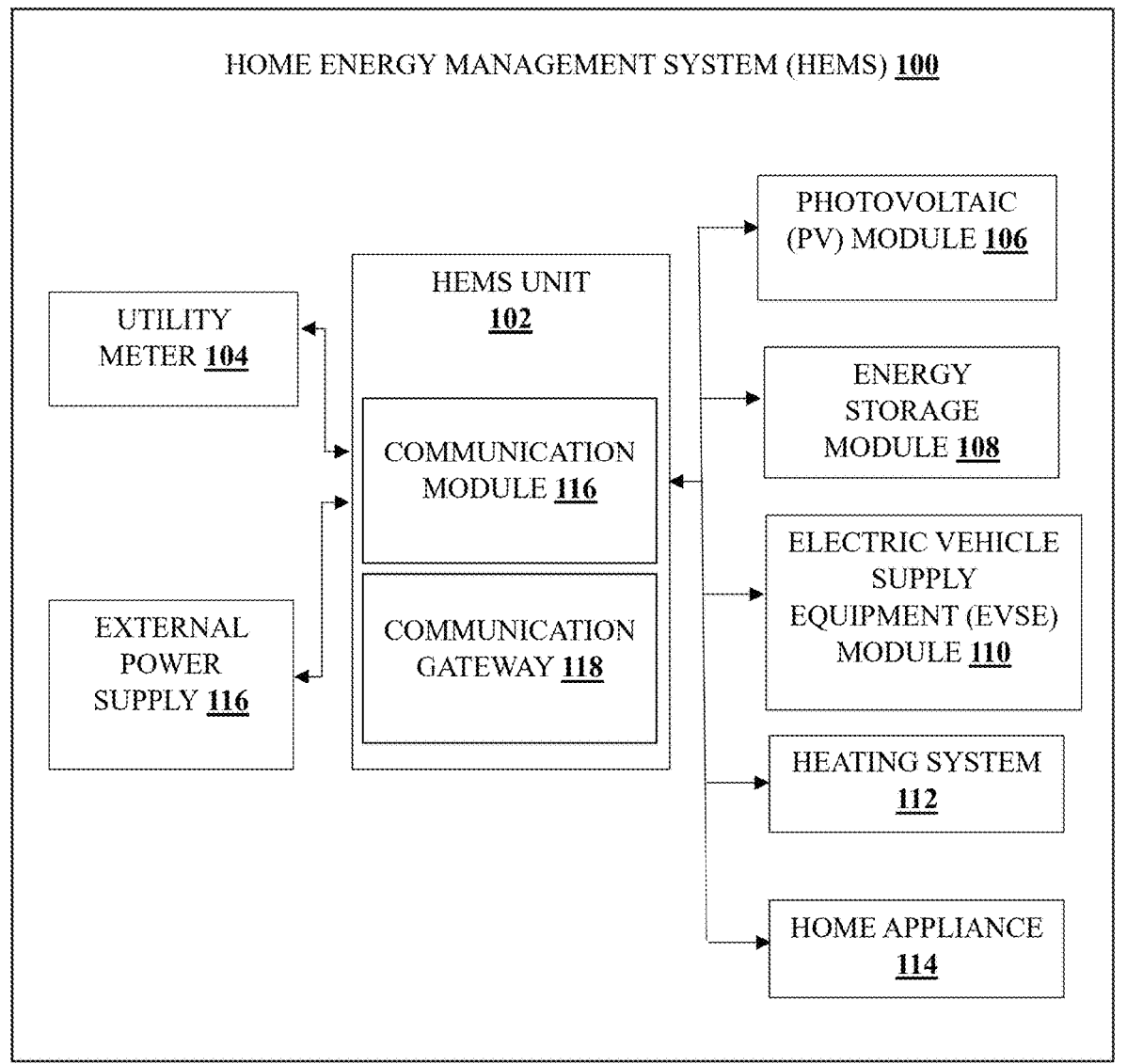
FIG. 1 is a block diagram of Home Energy Management System (HEMS) according to an embodiment.

For simplicity and clarity of illustration, the figures illustrate the general manner of construction. The description and figures may omit the descriptions and details of well-known features and techniques to avoid unnecessarily obscuring the present disclosure. The figures exaggerate the dimensions of some of the elements relative to other elements to help improve understanding of embodiments of the present disclosure. The same reference numeral in different figures denotes the same element.

Although the detailed description herein contains many specifics for the purpose of illustration, a person of ordinary skill in the art will appreciate that many variations and alterations to the details are considered to be included herein.

Accordingly, the embodiments herein are without any loss of generality to, and without imposing limitations upon, any claims set forth. The terminology used herein is for the purpose of describing particular embodiments only and is not limiting. Unless defined otherwise, all technical and scientific terms used herein have the same meaning as commonly understood by one with ordinary skill in the art to which this disclosure belongs. The following terms and phrases, unless otherwise indicated, shall be understood to have the following meanings.

As used herein, the articles "a" and "an" used herein refer to one or to more than one (i.e., to at least one) of the grammatical object of the article. By way of example, "an element" means one element or more than one element. Moreover, usage of articles "a" and "an" in the subject specification and annexed drawings construe to mean "one or more" unless specified otherwise or clear from context to mean a singular form.

As used herein, the terms "example" and/or "exemplary" mean serving as an example, instance, or illustration. For the avoidance of doubt, such examples do not limit the herein described subject matter. In addition, any aspect or design described herein as an "example" and/or "exemplary" is not necessarily preferred or advantageous over other aspects or designs, nor does it preclude equivalent exemplary structures and techniques known to those of ordinary skill in the art.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

As used herein, the terms "left," "right," "front," "back," "top," "bottom," "over," "under" and the like in the description and in the claims, if any, are for descriptive purposes and not necessarily for describing permanent relative positions. The terms so used are interchangeable under appropriate circumstances such that the embodiments of the apparatus, methods, and/or articles of manufacture described herein are, for example, capable of operation in other orientations than those illustrated or otherwise described herein.

No element act, or instruction used herein is critical or essential unless explicitly described as such. Furthermore, the term "set" includes items (e.g., related items, unrelated items, a combination of related items and unrelated items, etc.) and may be interchangeable with "one or more." Where only one item is intended, the term "one" or similar language is used. Also, the terms "has," "have," "having," or the like are open-ended terms. Further, the phrase "based on" means "based, at least in part, on" unless explicitly stated otherwise.

As used herein, the terms "system," "device," "unit," and/or "module" refer to a different component, component portion, or component of the various levels of the order. However, other expressions that achieve the same purpose may replace the terms.

As used herein, the terms "couple," "coupled," "couples," "coupling," and the like refer to connecting two or more elements mechanically, electrically, and/or otherwise. Two or more electrical elements may be electrically coupled together, but not mechanically or otherwise coupled together. Coupling may be for any length of time, e.g., permanent, or semi-permanent or only for an instant. "Electrical coupling" includes electrical coupling of all types. The absence of the word "removably," "removable," and the like, near the word "coupled" and the like does not mean that the coupling, etc. in question is or is not removable.

As used herein, the term "or" means an inclusive "or" rather than an exclusive "or." That is, unless specified otherwise, or clear from context, "X employs A or B" means any of the natural inclusive permutations. That is, if X employs A; X employs B; or X employs both A and B, then "X employs A or B" is satisfied under any of the foregoing instances.

As used herein, two or more elements or modules are "integral" or "integrated" if they operate functionally together. Two or more elements are "non-integral" if each element can operate functionally independently.

As used herein, the term "real-time" refers to operations conducted as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As used herein, the term "approximately" can mean within a specified or unspecified range of the specified or unspecified stated value. In some embodiments, "approximately" can mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As used herein the term "component" refers to a distinct and identifiable part, element, or unit within a larger system, structure, or entity. It is a building block that serves a specific function or purpose within a more complex whole. Components are often designed to be modular and interchangeable, allowing them to be combined or replaced in various configurations to create or modify systems. Components may be a combination of mechanical, electrical, hardware, firmware, software and/or other engineering elements.

Digital electronic circuitry, or computer software, firmware, or hardware, including the structures disclosed in this specification and their structural equivalents, or in combinations of one or more of them may realize the implementations and all of the functional operations described in this specification. Implementations may be as one or more computer program products i.e., one or more modules of computer program instructions encoded on a computer-readable medium for execution by, or to control the operation of, data processing apparatus. The computer-readable medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that encodes information for transmission to a suitable receiver apparatus.

The actual specialized control hardware or software code used to implement these systems and/or methods is not limiting to the implementations. Thus, any software and any hardware can implement the systems and/or methods based on the description herein without reference to specific software code.

A computer program (also known as a program, software, software application, script, or code) is written in any appropriate form of programming language, including compiled or interpreted languages. Any appropriate form, including a standalone program or a module, component, subroutine, or other unit suitable for use in a computing environment may deploy it. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may execute on one computer or on multiple computers that are located at one site or distributed across multiple sites and interconnected by a communication network.

One or more programmable processors, executing one or more computer programs to perform functions by operating on input data and generating output, perform the processes and logic flows described in this specification. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of digital computer. A processor will receive instructions and data from a read-only memory or a random-access memory or both. Elements of a computer can include a processor for performing instructions and one or more memory devices for storing instructions and data. A computer will also include, or is operatively coupled to receive data, transfer data or both, to/from one or more mass storage devices for storing data e.g., magnetic disks, magneto optical disks, optical disks, or solid-state disks. However, a computer need not have such devices. Moreover, another device, e.g., a mobile telephone, a personal digital assistant (PDA), a mobile audio player, a Global Positioning System (GPS) receiver, etc. may embed a computer. Computer-readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. Special purpose logic circuitry may supplement or incorporate the processor and the memory.

To provide for interaction with a user, a computer may have a display device, e.g., a Cathode Ray Tube (CRT) or Liquid Crystal Display (LCD) monitor, for displaying information to the user, and a keyboard and a pointing device, e.g., a mouse or a trackball, by which the user may provide input to the computer. Other kinds of devices provide for interaction with a user as well. For example, feedback to the user may be any appropriate form of sensory feedback, e.g., visual feedback, auditory feedback, or tactile feedback; and a computer may receive input from the user in any appropriate form, including acoustic, speech, or tactile input.

A computing system that includes a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components, may realize implementations described herein. Any appropriate form or medium of digital data communication, e.g., a communication network may interconnect the components of the system. Examples of communication networks include a Local Area Network (LAN) and a Wide Area Network (WAN), e.g., Intranet and Internet.

The computing system may include clients and servers. A client and server are remote from each other and typically interact through a communication network. The relationship of the client and server arises by virtue of computer programs running on the respective computers and having a client-server relationship with each other.

Embodiments of the present invention may comprise or utilize a special purpose or general purpose computer including computer hardware. Embodiments within the scope of the present invention may also include physical and other computer-readable media for carrying or storing computer-executable instructions and/or data structures. Such computer-readable media can be any media accessible by a general purpose or special purpose computer system. Computer-readable media that store computer-executable instructions are physical storage media. Computer-readable media that carry computer-executable instructions are transmission media. Thus, by way of example and not limitation, embodiments of the invention can comprise at least two distinct kinds of computer-readable media: physical computer-readable storage media and transmission computer-readable media.

Although the present embodiments described herein are with reference to specific example embodiments it will be evident that various modifications and changes may be made to these embodiments without departing from the broader spirit and scope of the various embodiments. For example, hardware circuitry (e.g., Complementary Metal Oxide Semiconductor (CMOS) based logic circuitry), firmware, software (e.g., embodied in a non-transitory machine-readable medium), or any combination of hardware, firmware, and software may enable and operate the various devices, units, and modules described herein. For example, transistors, logic gates, and electrical circuits (e.g., Application Specific Integrated Circuit (ASIC) and/or Digital Signal Processor (DSP) circuit) may embody the various electrical structures and methods.

In addition, a non-transitory machine-readable medium and/or a system may embody the various operations, processes, and methods disclosed herein. Accordingly, the specification and drawings are illustrative rather than restrictive.

Physical computer-readable storage media includes RAM, ROM, EEPROM, CD-ROM or other optical disk storage (such as CDs, DVDs, etc.), magnetic disk storage or other magnetic storage devices, solid-state disks or any other medium. They store desired program code in the form of computer-executable instructions or data structures which can be accessed by a general purpose or special purpose computer.

As used herein, the term "network" refers to one or more data links that enable the transport of electronic data between computer systems and/or modules and/or other electronic devices. When a network or another communications connection (either hardwired, wireless, or a combination of hardwired or wireless) transfers or provides information to a computer, the computer properly views the connection as a transmission medium. A general purpose or special purpose computer access transmission media that can include a network and/or data links which carry desired program code in the form of computer-executable instructions or data structures. The scope of computer-readable media includes combinations of the above, that enable the transport of electronic data between computer systems and/or modules and/or other electronic devices. The term network may include the Internet, a local area network, a wide area network, or combinations thereof. The network may include one or more networks or communication systems, such as the Internet, the telephone system, satellite networks, cable television networks, and various other private and public networks. In addition, the connections may include wired connections (such as wires, cables, fiber optic lines, etc.), wireless connections, or combinations thereof. Furthermore, although not shown, other computers, systems, devices, and networks may also be connected to the network. Network refers to any set of devices or subsystems connected by links joining (directly or indirectly) a set of terminal nodes sharing resources located on or provided by network nodes. The computers use common communication protocols over digital interconnections to communicate with each other. For example, subsystems may comprise the cloud. Cloud refers to servers that are accessed over the Internet, and the software and databases that run on those servers.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a Network Interface Module (NIC), and then eventually transferred to computer system RAM and/or to less volatile computer-readable physical storage media at a computer system. Thus, computer system components that also (or even primarily) utilize transmission media may include computer-readable physical storage media.

Computer-executable instructions comprise, for example, instructions and data which cause a general purpose computer, special purpose computer, or special purpose processing device to perform a certain function or group of functions. The computer-executable instructions may be, for example, binary, intermediate format instructions such as assembly language, or even source code. Although the subject matter herein described is in a language specific to structural features and/or methodological acts, the described features or acts described do not limit the subject matter defined in the claims. Rather, the herein described features and acts are example forms of implementing the claims.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Similarly, while operations depicted herein in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may be integrated together in a single software product or packaged into multiple software products.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

Further, a computer system including one or more processors and computer-readable media such as computer memory may practice the methods. In particular, one or more processors execute computer-executable instructions, stored in the computer memory, to perform various functions such as the acts recited in the embodiments.

Those skilled in the art will appreciate that the invention may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. Distributed system environments where local and remote computer systems, which are linked (either by hardwired data links, wireless data links, or by a combination of hardwired and wireless data links) through a network, both perform tasks may also practice the invention. In a distributed system environment, program modules may be located in both local and remote memory storage devices.

The following terms and phrases, unless otherwise indicated, shall be understood to have the following meanings.

As used herein, the term "Unauthorized access" is when someone gains access to a website, program, server, service, or other system using someone else's account or other methods. For example, if someone kept guessing a password or username for an account that was not theirs until they gained access, it is considered unauthorized access.

As used herein, the term "IoT" stands for Internet of Things which describes the network of physical objects "things" or objects embedded with sensors, software, and other technologies for the purpose of connecting and exchanging data with other devices and systems over the internet.

As used herein "Machine learning" refers to algorithms that give a computer the ability to learn without explicit programming, including algorithms that learn from and make predictions about data. Machine learning techniques include, but are not limited to, support vector machine, artificial neural network (ANN) (also referred to herein as a "neural net"), deep learning neural network, logistic regression, discriminant analysis, random forest, linear regression, rules-based machine learning, Naive Bayes, nearest neighbor, decision tree, decision tree learning, and hidden Markov, etc. For the purposes of clarity, part of a machine learning process can use algorithms such as linear regression or logistic regression. However, using linear regression or another algorithm as part of a machine learning process is distinct from performing a statistical analysis such as regression with a spreadsheet program. The machine learning process can continually learn and adjust the classifier as new data becomes available and does not rely on explicit or rules-based programming. The ANN may be featured with a feedback loop to adjust the system output dynamically as it learns from the new data as it becomes available. In machine learning, backpropagation and feedback loops are used to train the Artificial Intelligence/Machine Learning (AI/ML) model improving the model's accuracy and performance over time. Statistical modeling relies on finding relationships between variables (e.g., mathematical equations) to predict an outcome.

As used herein, the term "Data mining" is a process used to turn raw data into useful information. It is the process of analyzing large datasets to uncover hidden patterns, relationships, and insights that can be useful for decision-making and prediction.

As used herein, the term "Data acquisition" is the process of sampling signals that measure real world physical conditions and converting the resulting samples into digital numeric values that a computer manipulates. Data acquisition systems typically convert analog waveforms into digital values for processing. The components of data acquisition systems include sensors to convert physical parameters to electrical signals, signal conditioning circuitry to convert sensor signals into a form that can be converted to digital values, and analog-to-digital converters to convert conditioned sensor signals to digital values. Stand-alone data acquisition systems are often called data loggers.

As used herein, the term "Dashboard" is a type of interface that visualizes particular Key Performance Indicators (KPIs) or Key Result Indicators (KRIs) for a specific goal or process. It is based on data visualization and infographics.

As used herein, a "Database" is a collection of organized information so that it can be easily accessed, managed, and updated. Computer databases typically contain aggregations of data records or files.

As used herein, the term "Data set" (or "Dataset") is a collection of data. In the case of tabular data, a data set corresponds to one or more database tables, where every column of a table represents a particular variable, and each row corresponds to a given record of the data set in question. The data set lists values for each of the variables, such as height and weight of an object, for each member of the data set. Each value is known as a datum. Data sets can also consist of a collection of documents or files.

As used herein, a "sensor" is a device that detects and measures physical properties from the surrounding environment and converts this information into electrical or digital signals for further processing. Sensors play a crucial role in collecting data for various applications across industries. Sensors may be made of electronic, mechanical, chemical, or other engineering components. Examples include sensors to measure temperature, pressure, humidity, proximity, light, acceleration, orientation etc.

The term "communication module" or "communication system" as used herein refers to a system which enables the information exchange between two points. The process of transmission and reception of information is called communication. The elements of communication include but are not limited to a transmitter of information, channel or medium of communication and a receiver of information.

The term "communication" as used herein refers to the transmission of information and/or data from one point to another. Communication may be by means of electromagnetic waves. Communication is also a flow of information from one point, known as the source, to another, the receiver. Communication comprises one of the following: transmitting data, instructions, information or a combination of data, instructions, and information. Communication happens between any two communication systems or communicating units.

The term "protocol" as used herein refers to a procedure required to initiate and maintain communication; a formal set of conventions governing the format and relative timing of message exchange between two communications terminals; a set of conventions that govern the interactions of processes, devices, and other components within a system; a set of signaling rules used to convey information or commands between boards connected to the bus; a set of signaling rules used to convey information between agents; a set of semantic and syntactic rules that determine the behavior of entities that interact; a set of rules and formats (semantic and syntactic) that determines the communication behavior of simulation applications; a set of conventions or rules that govern the interactions of processes or applications between communications terminals; a formal set of conventions governing the format and relative timing of message exchange between communications terminals; a set of semantic and syntactic rules that determine the behavior of functional units in achieving meaningful communication; a set of semantic and syntactic rules for exchanging information.

The term "communication protocol" as used herein refers to standardized communication between any two systems. An example communication protocol is a DSRC protocol. The DSRC protocol uses a specific frequency band (e.g., 5.9 GHz (Gigahertz)) and specific message formats (such as the Basic Safety Message, Signal Phase and Timing, and Roadside Alert) to enable communications between vehicles and infrastructure components, such as traffic signals and roadside sensors. DSRC is a standardized protocol, and its specifications are maintained by various organizations, including the Institute of Electrical and Electronics Engineers (IEEE) and Society of Automotive Engineers (SAE) International.

The term "bidirectional communication" as used herein refers to an exchange of data between two components. In an example, the first component can be a vehicle and the second component can be an infrastructure that is enabled by a system of hardware, software, and firmware.

The term "in communication with" as used herein, refers to any coupling, connection, or interaction using signals to exchange information, message, instruction, command, and/ or data, using any system, hardware, software, protocol, or format regardless of whether the exchange occurs wirelessly or over a wired connection.

The terms "non-transitory computer-readable medium" and "computer-readable medium" include a single medium or multiple media such as a centralized or distributed database, and/or associated caches and servers that store one or more sets of instructions. Further, the terms "non-transitory computer-readable medium" and "computer-readable medium" include any tangible medium that is capable of storing, encoding, or carrying a set of instructions for execution by a processor that, for example, when executed, cause a system to perform any one or more of the methods or operations disclosed herein. As used herein, the term "computer-readable medium" is expressly defined to include any type of computer-readable storage device and/or storage disk and to exclude propagating signals.

The term "application server" refers to a server that hosts applications or software that delivers a business application through a communication protocol. An application server framework is a service layer model. It includes software components available to a software developer through an application programming interface. It is system software that resides between the operating system (OS) on one side, the external resources such as a database management system (DBMS), communications and Internet services on another side, and the users' applications on the third side.

The term "rule-based system" as used herein comprises a set of facts of a scenario and a set of rules for how to deal with the set of facts comprising if and then statements, wherein the scenario is predefined in a system.

The term "cyber security" as used herein refers to application of technologies, processes, and controls to protect systems, networks, programs, devices, and data from cyber-attacks.

The term "cyber security module" as used herein refers to a module comprising application of technologies, processes, and controls to protect systems, networks, programs, devices and data from cyber-attacks and threats. It aims to reduce the risk of cyber-attacks and protect against the unauthorized exploitation of systems, networks, and technologies. It includes, but is not limited to, critical infrastructure security, application security, network security, cloud security, Internet of Things (IoT) security.

The term "encrypt" used herein refers to securing digital data using one or more mathematical techniques, along with a password or "key" used to decrypt the information. It refers to converting information or data into a code, especially to prevent unauthorized access. It may also refer to concealing information or data by converting it into a code. It may also be referred to as cipher, code, encipher, encode. A simple example is representing alphabets with numbers-say, 'A' is '01', 'B' is '02', and so on. For example, a message like "HELLO" will be encrypted as "0805121215," and this value will be transmitted over the network to the recipient(s).

The term "decrypt" used herein refers to the process of converting an encrypted message back to its original format. It is generally a reverse process of encryption. It decodes the encrypted information so that only an authorized user can decrypt the data because decryption requires a secret key or password. This term could be used to describe a method of unencrypting the data manually or unencrypting the data using the proper codes or keys.

The term "cyber security threat" used herein refers to any possible malicious attack that seeks to unlawfully access data, disrupt digital operations, or damage information. A malicious act includes but is not limited to damaging data, stealing data, or disrupting digital life in general. Cyber threats include, but are not limited to, malware, spyware, phishing attacks, ransomware, zero-day exploits, trojans, advanced persistent threats, wiper attacks, data manipulation, data destruction, rogue software, malvertising, unpatched software, computer viruses, man-in-the-middle attacks, data breaches, Denial of Service (DoS) attacks, and other attack vectors.

The term "hash value" used herein can be thought of as fingerprints for files. The contents of a file are processed through a cryptographic algorithm, and a unique numerical value, the hash value, is produced that identifies the contents of the file. If the contents are modified in any way, the value of the hash will also change significantly. Example algorithms used to produce hash values: the Message Digest-5 (MD5) algorithm and Secure Hash Algorithm-1 (SHA1).

The term "integrity check" as used herein refers to the checking for accuracy and consistency of system related files, data, etc. It may be performed using checking tools that can detect whether any critical system files have been changed, thus enabling the system administrator to look for unauthorized alteration of the system. For example, data integrity corresponds to the quality of data in the databases and to the level by which users examine data quality, integrity, and reliability. Data integrity checks verify that the data in the database is accurate, and functions as expected within a given application.

The term "alarm" as used herein refers to a trigger when a component in a system or the system fails or does not perform as expected. The system may enter an alarm state when a certain event occurs. An alarm indication signal is a visual signal to indicate the alarm state. For example, when a cyber security threat is detected, a system administrator may be alerted via sound alarm, a message, a glowing LED, a pop-up window, etc. Alarm indication signal may be reported downstream from a detecting device, to prevent adverse situations or cascading effects.

The term "in communication with" as used herein, refers to any coupling, connection, or interaction using electrical signals to exchange information or data, using any system, hardware, software, protocol, or format, regardless of whether the exchange occurs wirelessly or over a wired connection.

As used herein, the term "cryptographic protocol" is also known as security protocol or encryption protocol. It is an abstract or concrete protocol that performs a security-related function and applies cryptographic methods often as sequences of cryptographic primitives. A protocol describes how the algorithms should be used. A sufficiently detailed protocol includes details about data structures and representations, at which point it can be used to implement multiple, interoperable versions of a program. Cryptographic protocols are widely used for secure application-level data transport. A cryptographic protocol usually incorporates at least some of these aspects: key agreement or establishment, entity authentication, symmetric encryption, and message authentication material construction, secured application-level data transport, non-repudiation methods, secret sharing methods, and secure multi-party computation. Hashing algorithms may be used to verify the integrity of data. Secure Socket Layer (SSL) and Transport Layer Security (TLS), the successor to SSL, are cryptographic protocols that may be used by networking switches to secure data communications over a network.

The embodiments described herein can be directed to one or more of a system, a method, an apparatus, and/or a computer program product at any possible technical detail level of integration. The computer program product can include a computer-readable storage medium (or media) having computer-readable program instructions thereon for causing a processor to carry out aspects of the one or more embodiments described herein.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer-readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

The embodiments described herein include mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments are for purposes of illustration but are not exhaustive or limiting to the embodiments described herein. Many modifications and variations will be apparent to those of ordinary skill in the art without departing from the scope and spirit of the described embodiments. The terminology used herein best explains the principles of the embodiments, the practical application and/or technical improvement over technologies found in the marketplace, and/or to enable others of ordinary skill in the art to understand the embodiments described herein.

As referred herein, "HEMS on a stick" refers to a dongle/stick device that connects to a port on the utility meter. It comprises the hardware and software of the HEMS system on the dongle device.

As referred herein, "energy consuming device" refers to a device in need of energy. The "first device" refers to an energy consuming device.

As referred herein, "energy producing device" refers to a device with excess energy to provide to the energy consuming device. The "second device" refers to an energy producing device.

As referred herein, "HAN port" refers to a Home Area Network (HAN) port or a P1 port. The port allows to gather and monitor energy usage data in a household, and the data is read electronically. The port provides real-time energy consumption to the listening device, such as a HEMS unit.

As referred herein, "ZigBee" refers to a specification for a suite of high level communication protocols using small, low-power digital radios based on the IEEE 802.15.4 standard for wireless home area networks (WHANs).

As referred herein, "RJ45" refers to Registered Jack-45. RJ45 connector is a standardized interface and is used to connect an internet enabled device with another network device. RJ12 plug may be used to provide telephone connections.

As referred herein, "RJ485" refers to a specification that defines the electrical interface and physical layer for communication of electrical devices.

As referred herein, "OLE" stands for Object Linking and Embedding, and is a standard that provides integration among applications.

As referred herein, "smart meter" refers to an electricity meter that records information such as the power usage amount, current and voltage levels, and does real-time monitoring, and transmits bi-directionally the measurement results to the electric power company and the consumer via a neighbour area network or a home area network.

Business problem: A Home Energy Management System (HEMS) may be used to control and manage the energy consumption of a household. HEMS connected to the utility meter may read customers' energy data, current on all phases, etc. Households nowadays have other energy drawing components, such as an electric vehicle, a battery storage, etc. The HEMS system may not be able to control the operation of the additional energy loads.

Technical problem: With the HEMS connecting to various energy consuming devices and energy producing devices, home appliances and heavy energy drawing appliances, energy transfer from one device to another needs to be controlled and managed so as to optimize the energy consumption and energy transfer among the connected devices.

Business solution: There is a need for a system that not only connects to household appliances but also to other energy drawing components. Some examples of energy drawing components that may be connected in a household include a solar generation unit, an energy storage unit, an electric vehicle, an Electric Vehicle Supply Equipment (EVSE), and a heating system. The present disclosure provides a home energy management system that connects to home appliances and also to heavy energy drawing units to control and optimize energy transfer among the connected devices.

Technical solution: FIG. 1 is a schematic block diagram of a home energy management system (HEMS) 100 according to an embodiment. Referring to FIG. 1, the home energy management system comprises a HEMS unit 102. The HEMS unit 102 may be implemented in a household and manage energy (power) supply, consumption, storage, and the like in the home. The HEMS unit may be connected to devices associated with power supply, energy consumption, energy production, and energy storage, which are installed or provided in the home. The HEMS unit may be implemented on a stick or as a dongle. The HEMS unit may control operations of the connected devices. As illustrated in FIG. 1, the HEMS unit 102 may be connected to at least one of a utility meter (or a smart meter) 104, a photovoltaic (PV) module 106, an energy storage module 108, an Electric Vehicle Supply Equipment (EVSE) 110, a heating system 112 or Heating, ventilation, an air conditioning (HVAC) unit, and a home appliance 114. However, the kinds of devices connected to the HEMS may be variously changed according to an embodiment. The HEMS unit may be further connected to an external power supply 116.

The HEMS unit may be a portable unit, an attachable/detachable unit, or a fixed unit. The HEMS unit 102 may be a dedicated unit located within the house and connected to smart home devices via wired or wireless connections. Alternatively, the HEMS unit 102 may be remotely implemented via a cloud server through the Internet and configured to remotely monitor and control the operations of the devices. In an embodiment, the HEMS unit 102 may be provided with software to monitor and control the operations of the various connected devices. The HEMS unit 102 may be further provided with an interface associated with input and output devices to interact with a user of the Home Energy Management System. The HEMS unit 102 may be further connected to a cloud via a public or private network to communicate with other entities such as the utility company and weather agencies to facilitate the planning and controlling of the Home Energy Management System. In one example, the HEMS unit 102 may be implemented via the cloud server through software without dedicated hardware structure for the house. It is noted that the term cloud recited in the present disclosure is used as a general term and may include any computing network involving carriers, router, computers, controllers, circuitries, servers or the like configured to store data and perform data processing functions and facilitate communication between various entities.

In an embodiment, the HEMS unit 102 may be constructed with computational capabilities and multiple communication technologies but without its own integral display screen. Rather it may be configured to communicate with remote devices that have user interface displays, such as, for example, smart phones, web-enabled TV, etc, so as to communicate with the user via these displays. The HEMS unit may also have the capability of operating over multiple communication networks which use different formats, protocols, and bandwidths. This allows HEMS units to acquire and control data of one communication network and to supply that data to another communication network, even though these networks may not be generally compatible. The control of the data may include putting the data in a format and/or location such as a database, whereby it is accessible by the other communication networks. In an embodiment the system translates the data from a protocol understandable by one communication into a protocol understandable by the other communication networks.

The HEMS unit 102 may include a communication module 116 and a communication gateway 118. The communication module 116 may communicate and exchange information with the connected devices through the communication gateway 118. The communication module may be a short-range wireless communication module, examples of which include Bluetooth™, Wi-Fi, and ZigBee. The communication gateway may receive information on power from power management-related devices that are installed in the home. The communication gateway may transmit information on the received power to the communication module. In an example, the communication module and the HEMS unit may be connected to each other through the internet.

The home energy management system described in embodiments herein enables users to identify, monitor, schedule, and optimize the energy usage of all of the appliances and devices in their homes. The users may use this data and the home energy management system to control when appliances and devices are powered and unpowered, thereby reducing overall energy consumption and associated costs. The home energy management system may also essentially extend a smart grid into homes and businesses, enabling energy utilities to identify the energy consumption of different types of appliances using anonymized energy consumption data. The home energy management system may provide utilities with access to actionable energy consumption information bundled with the ability to take real-time action.

Technical result: FIG. 2 shows a flowchart for a method of the home energy management system according to an embodiment, An embodiment relates to a method, comprising: receiving, real-time energy information of energy consuming devices and energy producing devices, using a communication gateway of a communication module 202, wherein the energy consuming devices and the energy producing devices are electrically coupled to an energy management module, also referred to as HEMS unit 102; receiving, input energy data from a utility meter, using the communication gateway, wherein the energy management module is electrically coupled to the utility meter 204; determining, energy consumption data of the energy consuming devices and the energy producing devices from the energy information 206; identifying, a first device based on a first set of predefined priority values assigned to the energy consuming devices, wherein the first device requires energy 208; identifying, a second device based on a second set of predefined priority values assigned to the energy producing devices, wherein the second device has excess energy 210; establishing, a wireless connection between the first device and the second device using the communication gateway 212; and controlling, energy transfer from the second device to the first device based on instructions received from an application, wherein the instructions are based on the energy consumption data and the input energy data to enable smart scheduling and power optimization among the energy consuming devices and the energy producing devices 214.

Technical details specific to the technical solution: The home energy management system (HEMS) is responsible for real-time power management and estimation of demanded power, and a utility meter 104 measures the amount of power consumption in real-time. According to an embodiment, the utility meter 104 may be connected to the HEMS unit 102 through a Home Area Network (HAN) port or a P1 port. The utility meter may be a smart meter or advanced measuring system (AMS), that provides the energy data to the electricity suppliers almost continuously. The meter may have a connection port, such as a HAN-port (Home Area Network)-port or a P1 port, that provides the users an overview of their data, and optimizes their consumption, almost in real-time. The energy consumption data, current and voltage quality data may be streamed through the HAN port. In case of physical interface, an RJ45 plug or RJ12 plug may be used. The utility meter 104 may communicate with the energy service provider that provides (e.g., supplies) energy to the home. For example, utility meter 104 may receive information (e.g., data) from energy service providers associated with the energy that energy service provider is providing to the home, such as, for instance, the price of the energy being provided to the home. Utility meter 104 may then send the information received from the energy service provider to the HEMS unit 102. That is, HEMS unit 102 may communicate with (e.g., receive information from) energy service provider through the utility meter 104. The utility meter 104 may measure a usage amount of power supplied from a power system to the home and consumed in the home.

In an embodiment the utility meter 104 may communicate by an IEEE 802.15.4 radio (such as in the configuration of a ZigBee type). In another embodiment, the utility meter may also communicate by a number of other standards such as IEEE 1901 (e.g. Home Plug Green Phy or Home Plug AV specifications) among others. The utility meter 104 may determine (e.g., measure) the amount of energy being provided (e.g., supplied) to the home by an energy service provider and send this information to the HEMS unit.

The utility meter 104 is an electronic metering device having a function of measuring total amount of power consumption of a home during respective time bands, and a communication function of transmitting the measured values. Particularly, the utility meter 104 according to an embodiment may be implemented as a smart meter. The smart meter may transmit information on the power usage amount to the communication gateway. In comparison to the traditional metering device, the smart meter may have an LCD display, measure power consumption amount in real-time, and transmit bi-directionally the measurement result to the electric power company and the consumer via a neighbor area network or a home area network. The smart meter may be accessed remotely which allows detection of problems and provides faster resolution to the issues. Smart meters may also provide more convenience of use and accuracy of readings than a traditional utility meter.

According to an embodiment of the system the energy management module or the HEMS unit is configured to electrically couple with one or more of a first utility meter, a second utility meter, and a smart meter based on a set of criteria. The criteria may include selecting a meter based on the utility provider having less energy price at the given time. According to an embodiment of the method the energy management module or the HEMS unit is configured to electrically couple with one or more of a first utility meter, a second utility meter, and a smart meter based on a set of criteria. The criteria may include selecting a meter based on the utility provider having less energy price at the given time.

According to an embodiment of the system the energy consuming devices comprises one or more of a home appliance, an electric vehicle, a battery storage device, and a heating system.

According to an embodiment of the system the energy producing devices comprises one or more of a photovoltaic system, an electric vehicle, an electric vehicle supply equipment (EVSE), a battery storage device, and a generator.

According to an embodiment of the method the energy consuming devices comprises one or more of a home appliance, an electric vehicle, a battery storage device, and a heating system. According to an embodiment of the method the energy producing devices comprises one or more of a photovoltaic system, an electric vehicle, an electric vehicle supply equipment (EVSE), a battery storage device, and a generator.

The HEMS unit manages the supply and demand of electric power that is used in the house. The HEMS unit may be electrically connected to one or more of a home appliance, a battery storage device, a heating system, a photovoltaic system, an electric vehicle, an electric vehicle supply equipment (EVSE), a battery storage device, and a generator. The HEMS unit may be electrically connected to one or more of the connected devices that run on power supplied from the power grid. The power grid may be the external power supply. The HEMS may be electrically connected to the PV module (solar power generating equipment) and the energy storage module. The PV module generates an electric power using the renewable energy, and the power output from the PV module may vary depending on a meteorological condition. The PV module 106 may generate power by using a photoelectric effect and supply the generated power to the home. Although the power generated by the PV module 106 is DC power, various power consumption devices in the home may operate by using AC power. A PV inverter may convert DC power supplied from the PV module into AC power to supply the converted AC power to the home. The solar panel of the PV module may generate a DC electric power having a voltage that is the same or different from the voltage supplied by the HEMS unit. In an embodiment, the house may be further connected to the PV module 106 via a switch board. The PV module 106 may be configured to generate and supply electric power to the HEMS or to the connected devices via an internal power line. Alternatively, one or more DC/AC inverters may be provided with the PV module 106 and/or the switch board for power transitions. In an embodiment, the HEMS unit 102 may be configured in the form in which the PV module 106 is connected to a power conversion unit. Here, the power supplied from the PV module 106 may be converted by the power conversion unit, and the converted power may be stored in the energy storage module 108 or supplied to an electric vehicle (EV) through an Electric Vehicle Supply Equipment (EVSE) 110 or the home appliance 114. In an embodiment, the power conversion unit may include a DC/AC converter for converting the power supplied from the PV module 106 so that the converted power is stored in the energy storage module 108.

Although the HEMS unit 102 includes the PV module 106 in this disclosure, the HEMS unit 102 may include various types of environmentally friendly power generation modules and inverters (DC to AC) corresponding thereto.

The energy storage module 108 may comprise a battery. The energy storage module 108 may further include a power conversion unit. The power conversion unit may include a plurality of inverters and converters. For example, the power conversion unit may convert the power stored in the energy storage module 108 from DC power into AC power to supply the converted AC power to the outside or the devices connected to the HEMS unit. The power conversion unit may convert the remaining AC power into the DC power. The power conversion unit may include a DC/AC inverter for storing the converted DC power into the energy storage module 108.

An energy management unit may control the power conversion operation of the power conversion unit. The energy storage module 108 may include a battery management module that can manage the power of the energy storage module 108 and can measure the temperature, current, voltage, charge amount, etc., of the battery of the energy storage module and monitor the state of the battery of the energy storage module 108. Additionally, the operating environment of the battery of the energy storage module can be controlled to optimize its energy based on the measured and monitored state of the battery of the energy storage module. The energy storage module 108 may include an energy management unit, a power conversion unit, and a battery. The energy storage module may be a rechargeable power storage element, and, a secondary battery, typically, a lithium-ion battery, a nickel-hydrogen battery, or a lead storage battery, etc., may be applied.

The energy storage module 108 may store power supplied from the PV module 106, the Electric Vehicle Supply Equipment (EVSE) 110 and/or a battery of an EV or residual power remaining after the consumption of the supplied power.

The electric vehicle supply equipment (EVSE) 110 may be connected to the HEMS unit to recharge an electric vehicle (EV). The EV may be configured to recharge a traction battery from the EVSE. The EVSE may be a connection to an electrical outlet. The EVSE may be electrically coupled to a charger. The EVSE 110 may provide circuitry and controls to regulate and manage the transfer of energy to and from the electric vehicle. The EVSE 110 may receive DC or AC electric power. The EVSE may be provided with an energy storage unit for storing electric power supplied through a renewable energy source or power system. The energy storage unit may be configured using a plurality of batteries including storage batteries. The EVSE 110 may have a charge connector for plugging into a charge port of the vehicle. The charge port may be any type of port configured to transfer power from the EVSE to the vehicle. The charge port may be electrically coupled to a charger or on-board power conversion module. The power conversion module may condition the power supplied from the EVSE 110 to provide the proper voltage and current levels to the traction battery for storage. The power conversion module may interface with the EVSE 110 to coordinate the delivery of power to the electric vehicle. The EVSE connector may have pins that mate with corresponding recesses of the charge port. The EV charger may be connected to the EV to control charging and discharging with respect to the battery provided in the EV. Alternatively, various components described as being electrically coupled or connected may transfer power using a wireless inductive coupling. Additionally, the electric vehicle may be configured to provide electric power from the traction battery to off-board power storage to a power grid via the EVSE 110 under the control of HEMS unit 102.

In an embodiment, the HEMS unit 102 may be connected to a home appliance 114. The connection to the home appliance 114 may be through a smart plug, which may include a power usage amount measurement module measuring a power usage amount of the connected home appliance and a communication module for transmitting the measured power usage amount to the HEMS unit 102 via the communication gateway. Also, the power may be supplied or blocked to the connected home appliance according to a control signal received from the gateway for the smart plug control. According to an embodiment, when a separate sensor for detecting an operation of the home appliance 114 is attached to the home appliance, the HEMS unit 102 may be connected to the corresponding sensor to confirm the operation of the home appliance.

FIG. 3 shows steps executed by a system of home energy management system according to an embodiment. An embodiment related to a system 340 comprising an energy management module 344, also referred to as HEMS unit 102, wherein the energy management module is electrically coupled to a utility meter 342; energy consuming devices 348 and energy producing devices 350 electrically coupled to the energy management module, the energy management module comprising: a communication gateway communicatively coupled to the utility meter, the energy consuming devices, and the energy producing devices; a communication module 346, configured to receive from the communication gateway, input energy data from the utility meter 302, and energy information of the energy consuming devices and the energy producing devices 304; a processor storing instructions in a non-transitory memory that, when executed, cause the processor to: determine energy consumption data of the energy consuming devices and the energy producing devices from the energy information 306; identify a first device based on a first set of predefined priority values assigned to the energy consuming devices, wherein the first device requires energy 308; identify a second device based on a second set of predefined priority values assigned to the energy producing devices, wherein the second device has excess energy 310; establish a wireless connection between the first device and the second device using the communication gateway 312; and control energy transfer from the second device to the first device based on instructions received by the communication module from an application, wherein the instructions are based on the energy consumption data and the input energy data to enable smart scheduling and power optimization among the energy consuming devices and the energy producing devices 314.

FIG. 4 shows steps executed by a system of home energy management system according to an embodiment. An embodiment related to a system 440 comprising: a utility meter 442, wherein the utility meter is electrically coupled to power grid; an energy management module 444, wherein the energy management module is electrically coupled to the utility meter; energy consuming devices 448 and energy producing devices 450 electrically coupled to the energy management module, the energy management module comprising: a communication gateway communicatively coupled to the utility meter, the energy consuming devices and the energy producing devices; a communication module 446 configured to receive from the communication gateway, input energy data from the utility meter 402, and energy information in real-time 404, of the energy consuming devices and the energy producing devices electrically coupled to the energy management module; a processor storing instructions in a non-transitory memory that, when executed, cause the processor to: determine energy consumption data of the energy consuming devices and the energy producing devices from the energy information 406; identify a first device based on a first set of predefined priority values assigned to the energy consuming devices, wherein the first device requires energy 408; identify a second device based on a second set of predefined priority values assigned to the energy producing devices, wherein the second device has excess energy 410; establish a wired connection between the first device and the second device using the energy management module 412; and control energy transfer from the second device to the first device based on the energy consumption data and the input energy data to enable smart scheduling and power optimization among the energy consuming devices and the energy producing devices 414.

As described with reference to FIG. 1, the HEMS unit 102 may be connected to various devices within the home. The communication module may acquire a power flow for each power path or various information associated with the power state. The HEMS unit 102 may control supply, consumption, and a storage operation of power in the home on the basis of the acquired information. The utility meter 104 may measure a power usage amount on the basis of the power supplied from the power system or the power grid or the microgrid. The power supplied from the power system may be converted into the form of DC power by the power conversion unit and then stored in the energy storage module 108 or consumed by the EV through the EVSE 110 or the home appliance 114. The DC power supplied from the PV module 106 may be converted into AC power by a PV inverter. The converted power may be supplied to the EV connected to the EVSE 110 or the home appliance 114, or the heating system and then consumed. According to an embodiment, when remaining power is generated after the consumption, the generated remaining power may be discharged to the power system or sold again or be stored by converting into the form of DC power by the power conversion unit and then stored in the energy storage module 108.

The EVSE 110 may charge the battery of the EV by using the power generated by the PV module 106, the power supplied from the power system, or the power converted into the form of DC power by the power conversion unit and then stored in the energy storage module 108. To charge the battery of the EV, the EVSE 110 may convert the AC power into the DC power. Also, the EVSE 110 may discharge the power charged in the battery of the EV. In this case, the EVSE 110 may convert the power charged in the battery of the EV from DC power into the AC power. The converted power may be stored in the energy storage module 108, supplied to the home appliance 114, discharged to the power system, or sold again.

The EV may be further configured to wirelessly communicate with a variety of digital entities via a wireless transceiver. For instance, the vehicle may be configured to communicate with the HEMS unit 102 (local or remote) via the wireless transceiver to perform various operations. Additionally or alternatively, the communication between the vehicle and the HEMS unit may be enabled by the EVSE 110 coupled with the charge port configured to support digital communication protocols. The wireless transceiver may be configured to support a variety of wireless communication protocols enabled by wireless controllers in communication with the wireless transceiver.

According to an embodiment of the system the system further comprises storing, by the processor, the input energy data, and the energy information, in a memory.

In an embodiment, by communicating with the energy consuming devices and energy producing devices, the HEMS unit 102 receives data on power consumption from each device and stores the received data in an internal storage device. At this time, the HEMS 102 stores the power consumption data with information representing the reception time. HEMS unit 102 has a function of accessing the network via a router. Network is, for example, the Internet. The router is a communication device that can access the network wirelessly or by wire. The HEMS unit 102 may upload data (including time information) related to power consumption stored in an internal storage device to a cloud server at predetermined timing (for example, predetermined time or predetermined time intervals). It should be noted that the data related to power consumption transmitted from the HEMS unit 102 to the integrated cloud server may not all be transmitted at the same timing. For example, it may be sent at a timing according to the electrical equipment.

According to an embodiment of the system the energy information further comprises one or more of an energy transfer data, an energy price data, an energy monitoring data, a peak wattage, a peak input current, an energy outage data, and an energy consumption pattern.

In an embodiment, the energy transfer data may be based on the amount of energy consumed by the energy consumption devices, the amount of energy transferred from the energy producing devices, the amount of excess energy sold back to the power grid, the amount of extra energy that may be needed from the energy producing devices, or the difference between the amount of energy consumed and the amount of energy produced by the connected devices.

In an embodiment, the energy price data may be one or more of price at which energy is bought from the power grid, the dynamic price at which energy is sold by the power grid, the price based on the demand of energy at the given time, or the real-time energy price at a given time.

In an embodiment, a peak wattage and a peak input current may be the amount of the highest power and the highest current that the system can withstand.

In an embodiment, the energy outage data may be the data on an interruption or a failure of energy from the power grid, an interruption of energy production from the PV module based on weather conditions, a difference between the energy produced and the energy consumed such that the energy consumed is more than the energy produced, or an emergency usage of the energy leaving no residual energy until energy input is resumed from the power grid or produced by the PV module.

In an embodiment, the energy consumption pattern may indicate the data based on the consumption of energy of each of the connected devices, the consumption of energy at a given time, or the consumption of energy of the connected devices of the household.

According to an embodiment of the system the energy consumption data of a device comprises one or more of an amount of energy required by the device, a characteristic of the device, and an energy consumption pattern. A characteristic of the device may include the specifications of the device such as energy consumption rate, performance of the device, energy saving options, environmentally friendly modes of the device, etc.

According to an embodiment of the system the first set of predefined priority values is based on one or more of a residual energy, an urgent energy need, a user preference, and a user defined schedule. According to an embodiment, a residual energy refers to the residual energy of a connected device and in case the residual energy is less than the threshold of energy required, that device may be given preference for energy transfer. An urgent energy need may include a medical device that is used in the household and its uninterrupted operation is required by the user, communication devices such as wi-fi, mobile phones, an electric vehicle that may have a scheduled travel time, a heating pump with a scheduled heating time, cooking appliances at specific times of the day, etc. According to an embodiment a user preference may be a user based energy need for a particular device at a given time. A user defined schedule may be an energy schedule created by the user of the household based on a workday or a holiday and the priority needs of the connected devices on these days.

According to an embodiment of the system the second set of predefined priority values is based on one or more of a time of day, an excess energy, a user preference, and an energy price data. In an embodiment, at a time of day when the PV module energy generation is at peak, such as during noon, the PV module may be considered for energy transfer or at times of low prices of energy from the grid, the energy from the grid may be considered for energy transfer.

In an embodiment, the HEMS unit 102 may store a set of priorities for each of the connected devices in a memory unit or a storage unit or transmit them to a terminal. The terminal may display the received priority through the display unit. Depending on the embodiment, the terminal may receive a modification request from the user based on the displayed priority. In this case, the terminal transmits a modification request to the HEMS unit 102, and the HEMS unit 102 may modify the priority in response to the received modification request. The HEMS unit 102 may control the operation of home appliances based on the predicted power generation amount of the PV module 106. The HEMS unit 102 may obtain power consumption information of home appliances based on control results. For example, the communication gateway may receive power usage information from the connected devices and transmit the received power usage information of each of the connected devices to the HEMS unit 102. The HEMS unit 102 may obtain the power consumption information based on the received power usage information of each connected device. The acquired power consumption information may be stored in a storage unit.

Technological advancement: According to an embodiment of the system the energy transfer is determined based on one or more of a state of charge of the first device, a state of charge of the second device, a discharge rate of the second device, a first threshold value of the first device, and a second threshold value of the second device.

According to an embodiment of the method the energy transfer is determined based on one or more of a state of charge of the first device, a state of charge of the second device, a discharge rate of the second device, a first threshold value of the first device, and a second threshold value of the second device.

According to an embodiment of the system the first threshold value and the second threshold value are based on one or more of an energy price data, a carbon footprint, a level of energy demand, and the energy consumption data. A carbon footprint may include the carbon footprint the user may be aiming for. The carbon footprint may represent the greenhouse gasses emitted by devices connected to the HEMS unit. In order to reduce the carbon footprint the user may schedule the devices in such a manner so as to reduce the direct and indirect emissions from each of the connected devices.

According to an embodiment of the system the processor is further configured to alter the first threshold value based on one or more of the first device reaching the first threshold value, and a user input to alter the first threshold value. In an embodiment, once the threshold value of the first device is reached, the processor may assign a new threshold value which may be higher than the previous threshold value. In another embodiment the threshold value may be altered by the user. The threshold value may be increased by the user in case the device is needed for a longer period of time.

According to an embodiment of the system the processor is further configured to alter the second threshold value based on one or more of the second device reaching the second threshold value and a user input to alter the second threshold value. In an embodiment, once the threshold value of the second device is reached, the processor may assign a new threshold value which may be higher than the previous threshold value. In another embodiment the threshold value may be altered by the user. The threshold value may be increased by the user in case the requirement of energy by the first device, the energy consuming device, is more than the energy needed by the second device, the device providing energy.

According to an embodiment of the system, the system comprises a user interface configured to receive a user input, wherein the energy transfer is determined based on the user input.

According to an embodiment of the system, the smart scheduling comprises one or more of a temporal scheduling, a pre-emptive scheduling, a cooperative scheduling, and a dynamic priority scheduling. A temporal scheduling may be scheduling of energy transfer at specific times. A pre-emptive scheduling may provide priority to a high priority energy demand from a connected device. In cooperative scheduling the energy consuming devices may take turns to draw energy from the energy producing devices. In dynamic priority scheduling the priority of the energy consuming device and the priority of the energy producing device may be changed during the execution of energy transfer. As the energy requirement of a device increases or decreases the priority of the device may also change.

According to an embodiment of the system the smart scheduling is based on one or more of a time of use, a dynamic input energy price, a dynamic output energy price, a critical peak price, an energy consumption pattern, a user goal, a geographic location, and a user preference.

HEMS may manage multiple devices configured to operate based on pricing data of a given utility associated with the operation of a given device. The HEMS may be utilized to optimize management of smart devices. In some cases, smart devices are devices having programming and or logic that configures the device to modify the operation of the device based on a varying price provided by the energy provider, such as an electricity provider, a gas provider, and the like. However, a given HEMS may be required to manage multiple devices made by different manufacturers that do not cooperate with the HEMS to optimize operation such that overall consumption of various utilities in terms of price is reduced.

The amount of energy generated by a photovoltaic (PV) module 106 or other renewable resource (e.g., wind turbines) may be communicated to the HEMS unit 102, and the HEMS unit 102 may determine whether to use, store, or sell the energy generated based on the scheduling of the energy loads in the home, the real-time pricing (RTP) tariff for selling energy to the electrical grid, and the remaining capacity of the energy storage module 108 used to store the energy for later use. In some implementations, the HEMS unit 102 may treat the energy generated by the renewable resource as a future fixed generation source with dynamic pricing and the energy stored by the energy storage module 108.

The HEMS unit 102 may be configured to control and coordinate the energy distribution of the house based on various factors. For instance, due to the operational nature of the PV module 106, electricity may only be generated during daytime with sufficient sunlight. The HEMS unit 102 may anticipate and determine the amount of electric power to be generated by the PV module 106 using weather report information indicative of the time and condition of the sunlight to coordinate a power arbitration process and optimize an energy profile of the household. The power arbitration may be performed in a variety of manners. For instance, the HEMS unit 102 may apply a balanced arbitration strategy to evenly distribute the power generated by the PV module 106 to multiple entities. The HEMS unit 102 may evenly divide the solar power and distribute to the energy storage module 108 and EVSE 110 for storage. The HEMS unit 102 may further distribute the solar power to the power grid. Alternatively, the HEMS unit 102 may apply a charging rate/capacity-based arbitration strategy to distribute the solar power based on how fast and how much each entity may receive the electric charge.

In the home area grid, electricity can be generated by using the solar-power generator or the wind-power generator and supplied to the home itself through the solar-power inverter or the wind-power inverter. Alternatively, the electricity generated by them may be resold to an external entity (e.g., electric power company). The HEMS unit 102 anticipates an upcoming solar power generation using weather information from the cloud and predicts power demand of various entities associated with the house during the period of time when the solar power is available. The HEMS unit 102 may calculate an anticipated power generation amount using the weather information. The power demand may be determined through past power usage records associated with the house. The HEMS unit 102 verifies the state of charge (SOC) of one or more batteries (power storages) such as the energy storage module 108 and/or vehicle battery connected to the house.

According to an embodiment of the system the application comprises a mobile application.

According to an embodiment of the system the mobile application is in communication with the communication module through an external web portal.

According to an embodiment of the system the communication module communicates with the first device over a first communication protocol and communicates with the second device over a second communication protocol.

According to an embodiment of the system the communication module is further configured to: receive the input energy data and the energy information at regular intervals; and aggregate the input energy data and the energy information.

According to an embodiment of the system the communication module is further configured to transmit the input energy data and the energy information for storage to one or more of a cloud server and a local storage.

According to an embodiment of the system the communication module is further configured to retrieve the input energy data and the energy information from one or more of the cloud server and the local storage; and present the input energy data and the energy information for future reference.

According to an embodiment of the system the communication module is configured to receive the energy information of the energy consuming devices and the energy producing devices in real-time.

According to an embodiment of the system the communication module is further configured to transmit the input energy data and the energy information in real-time to a user interface.

According to an embodiment of the method the application comprises a mobile application. According to another embodiment of the method the mobile application is in communication with the communication module through an external web portal.

According to an embodiment of the method the communication module communicates with the first device over a first communication protocol and communicates with the second device over a second communication protocol.

According to an embodiment of the method the communication module is further configured to: receiving, the input energy data and the energy information at regular intervals; and aggregating, the input energy data and the energy information. The method further comprises transmitting, the input energy data and the energy information for storage to one or more of a cloud server and a local storage. The method further comprises retrieving, the input energy data and the energy information from one or more of the cloud server and the local storage; and presenting, the input energy data and the energy information for future reference.

According to an embodiment the method further comprises transmitting the input energy data and the energy information in real-time to a user interface, receive the input energy data and the energy information at regular intervals; and aggregate the input energy data and the energy information.

According to an embodiment of the method the communication module is further configured to transmit the input energy data and the energy information for storage to one or more of a cloud server and a local storage.

According to an embodiment of the method the communication module is further configured to retrieve the input energy data and the energy information from one or more of the cloud server and the local storage; and present the input energy data and the energy information for future reference.

According to an embodiment of the method the communication module is configured to receive the energy information of the energy consuming devices and the energy producing devices in real-time.

According to an embodiment of the method the communication module is further configured to transmit the input energy data and the energy information in real-time to a user interface.

According to an embodiment of the system a protocol used by the communication module to connect to the utility meter comprises one or more of a power line communication (PLC) protocol, a ZigBee protocol, an IPV6 over low power wireless personal area networks (6LoWPAN) protocol, a radio frequency (RF) protocol, an IEC 61107 protocol, Ethernet, NB-IoT, General Packet Radio Service (GPRS), WiFi, Wireless Smart Utility Network (Wi-Sun) protocol, Wi-Fine, Long Range (LoRa) protocol, Meter-bus (M-Bus), RS485, Bluetooth, Infrared (IR) protocol, and a Dutch Smart Meter Requirements (DSMR) protocol.

According to an embodiment of the system the protocol used by the communication module to connect to the energy consuming devices and the energy producing devices comprises one or more of a ModBus protocol, a ModBus RTU (Remote Terminal Unit) protocol, a ModBus TCP/IP protocol (Transmission Control Protocol/Internet Protocol), an OLE for Process Control (OPC Classic) protocol, an OPC UA (Unified Architecture)-Open Platform Communications protocol, a Distributed Network Protocol, a Controller Area Network (CAN) protocol, a DeviceNet protocol, an Ethernet I/P protocol, a Profibus/Profinet protocol, a Highway Addressable Remote Transducer (HART) protocol, an EtherCAT protocol, a ControlNet protocol, and an Optomux protocol.

According to an embodiment of the system the first device is on a local area network (LAN) and the second device is on a wide area network (WAN).

In an embodiment, a predetermined application software (also referred to as an "app") may be installed in a user terminal. The user terminal can be carried by the user of the vehicle, and exchange information with the HEMS unit 102 through the app. The user can operate the app through, for example, the touch panel display of the user terminal. The touch panel display of the user terminal can also give notifications to the user. The user terminal (the touch panel display) corresponds to one example of an interface, a web interface, or a mobile application, according to the present disclosure for interaction with the user. The HEMS unit contacts the user through a predetermined contact (e.g., the user terminal or the communication module).

The communication module may comprise any type of communication network, wired or wireless, configured to facilitate the communication and transmission of information, data, commands, etc. from one device to another device of the communication network(s) and between communication network(s). For example, the communication network (s) may be a local area network (LAN) (e.g., Ethernet or other IEEE 802.03 LAN technologies), Wi-Fi (e.g., IEEE 802.11 standards, wide area network (WAN), virtual private network (VPN), global area network (GAN)), any combination thereof, or any other type of communication network. The communication network may include a plurality of channels for communication. An example channel of the network may be a serial bus such as a Controller Area Network (CAN), a media-oriented system transport (MOST), an Ethernet network defined by the Institute of Electrical and Electronics Engineers (IEEE) 802 family of standards, as some examples. Redlink, WiFi, ZigBee, IEEE 802.15.4, IEEE 802.3, IEEE 802.11, Smart Energy Profile (SEP) 2.0, HomePlug, and/or power line carrier (PLC).

In an embodiment, the communication module may be configured to support a variety of wireless communication protocols enabled by wireless controllers in communication with the communication module. As a few non-limiting examples, the wireless controllers may include a Wi-Fi controller, a Bluetooth controller, a radio-frequency identification (RFID) controller, a near-field communication (NFC) controller, and other devices such as a ZigBee transceiver, an IrDA (Infrared Data Association) transceiver, an ultra-wide band (UWB) transceiver, or the like. The networking device may be one or more of a cable modem, a DSL modem, a DSL router, a wireless telecommunication modem (e.g., a long term evolution (LTE) modem, a worldwide interoperability for microwave access (WiMAX) modem, a universal mobile telecommunications (UMTS) modem, etc.), or other internet router capable of connecting the WAN to the LAN.

In another embodiment, the communication network may be one of a wired connection or a wireless connection. Examples of the communication network may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment may be configured to connect to the communication network in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In an embodiment the HEMS unit may further include a HEMS server capable of bidirectionally communicating with the other energy management systems such as Building Energy Management System (BEMS), Community Energy Management System (CEMS), and Factory Energy Management System (FEMS).

In an embodiment, the HEMS unit 102 may optimize the energy among the connected devices based on presence or absence of the user at home. The HEMS unit acquires user presence information and user absence information. In an embodiment, the user absence information may include information of a time for which the user is absent in the home. Particularly, the absence information may include a difference between the current time and the last time at which the presence of the user in the home is detected. In an embodiment, the user presence information may include information of a time for which the user is present in the home. Particularly, the presence information may include a difference between the current time and the last time at which the presence of the user in the home is detected and a difference between the last time at which the presence of the user in the home is detected and an initial time at which the presence of the user in the home is detected. In an embodiment, the user absence information and presence information may be acquired through at least one of a camera, a motion detection sensor, and a door/window sensor, which are provided in the home. The camera provided in the home may photograph the inside of the home in real-time to transmit the photographed image to the HEMS unit 102. The HEMS unit 102 may determine whether the user is absent or present in the home through the photographed image. The motion detection sensor provided in the home may detect a motion of the user that is present in the home. The motion detection sensor may transmit information on the detected motion of the user to the HEMS unit 102. The HEMS unit 102 may receive the information on the detected motion of the user via the communication gateway. The HEMS unit 102 may determine whether the user is absent or present in the home by using the information on the detected motion of the user. The communication module may transmit the acquired absence information and presence information to the HEMS unit 102 through the Internet. The communication gateway may periodically transmit the acquired absence information and presence information to the HEMS unit 102. For example, the communication gateway may transmit the acquired absence information and presence information to the HEMS unit 102 every hour. In an embodiment, when a difference between the current time and the last time at which the presence of the user in the home is detected is greater than a first reference time, the HEMS unit 102 may determine that the user is absent for a long time, for example, the first reference time may be five hours, but this is only an example. In an embodiment, when the user is absent in the home for a long time, the HEMS unit may determine the excess power generated from the PV module or the energy stored in the EV may be discharged to the grid as the household appliances may not need more energy during that time.

The following is an operation method of the HEMS according to an embodiment. The communication module may acquire input energy data from the utility meter and may receive an amount of power generated by the PV module 106. The communication module may further acquire energy management information including a PV power generation amount, an amount of power consumed by the home appliances in the home, an amount of power stored in the battery storage module, an amount of power consumed by the heating system, a remaining power amount of the battery of the EV, and a minimum charging amount of the EV. An amount of power consumed by the devices connected to the HEMS unit may represent the total power consumption amount of all or a portion of the connected devices in the home. The communication module may acquire the total power consumption amount of the connected devices in the home. The communication gateway may receive a remaining power amount of the battery provided in the EV from the EV or the EVSE 110. The HEMS unit 102 may include a wired communication interface or a wireless communication interface to receive energy information. The communication gateway may transmit the acquired energy information to the HEMS unit 102. The communication gateway may transmit the acquired energy information to the HEMS unit 102 through the Internet. The communication module of the HEMS unit 102 may receive the energy information from the wireless communication interface provided in the gateway through the Internet standard. The communication module may periodically transmit the acquired energy information to the HEMS unit 102. The communication module may transmit the acquired energy information to the HEMS unit 102 in real-time. The HEMS unit 102 may determine the amount of energy consumed by the energy consumption device and the energy information of the energy producing device based on the parameters given at that specific time and control of the energy transfer. In an embodiment, the HEMS unit may determine that the electric vehicle may need charging based on a scheduled trip and the EV may be put in a charging mode and charged through the EVSE by using at least one of power generated from the PV module 106 and power supplied from the power system/power grid. In an embodiment, the HEMS unit may determine that the energy storage module has only a minimum threshold of stored energy and may put the EV in a discharging mode and supply the power stored in the battery of the EV via the EVSE to the home appliance. The discharging mode of the EV according to this embodiment may be called a vehicle to home (V2H) mode. The HEMS unit 102 may determine the mode of the energy storage module and the EV as a charging mode when the PV power generation amount is greater than the power consumption amount of the energy consuming devices of the household, or when the remaining power amount of the battery of the energy storage module or the battery of the EV is less than the minimum charging amount. The HEMS unit 102 may control the energy transfer from the one connected device to another connected device on the basis of energy consumption data and the input energy data and enables smart scheduling and power optimization among the energy consuming devices and the energy producing devices.

The HEMS may include a security system that may communicate with a smart meter that is configured for proving the correctness of any smart appliance, and may communicate with a service provider configured for proving the correctness of the smart meter. In one exemplary security system, each meter has a copy of its own log, and each household meter is mapped to several other witnesses. The system also includes a commitment protocol that is used to ensure that witnesses will retrieve exactly the same log as the observation object owns. In addition, the system includes a challenge/response protocol to address the problem that some household meters do not respond or fail to acknowledge whether messages were sent successfully or not. Thus, the security system may be configured for (1) accountable, non-repudiable, malicious appliance inspection, (2) denial of service (DoS) attack mitigation for operation of diverse appliances and renewable sources in the home area, and (3) interoperability of energy system, wireless communication, and security methods.

In an embodiment, the HEMS unit 102 may in turn be connected to multiple energy meters, which may be energy management and control units. The energy meter may be a utility meter or a smart meter. The connections of the multiple energy meters may include a ZigBee connection, a 6LowPAN connection, a generic radio frequency (RF) connection, a proprietary RF connection, a power line communication (PLC) connection, or other connection types. Different energy meters may support different connection types (different protocols), and some energy meters may support multiple different connection types. Energy meters may additionally include control functionality as well as communication functionality. The energy meters may include one or more memories, a processing device, and a communication interface. The memory may be a non-volatile memory that stores firmware for the energy meter and/or a volatile memory. The processing device may include a programmable logic controller (PLC), a microcontroller, microprocessor, or programmable logic device such as a field programmable gate array (FPGA) or a complex programmable logic device (CPLD). Each of the energy meters may consume approximately 1 Watt, 0.5 Watt or less power when in standby. Moreover, the power consumed by the energy meters may be approximately 1 Watt even when under power. Each of the energy meters may be connected to or integrated into one or multiple connected devices. The connected devices may be any powered device that can plug into an electrical outlet. Examples of connected devices may include a storage module, an EVSE, a heating system, home appliances such as electric ovens, electric ranges, microwave ovens, coffee makers, washing machines, dryers, dishwashers, televisions, lights, fans, set top boxes, vacuum cleaners, air conditioners, and so on. In one embodiment, the energy meters may plug into electrical outlets, and the connected devices through the HEMS unit 102. For example, the energy meters may be wall outlet energy meters having a single switchable outlet and a single measuring point. The energy meters may also be power strip energy meters having multiple configurations with switchable outlets (e.g., 6 outlets in one embodiment) and multiple measuring points. Each of the energy meters measures an amount of power usage each time a prescribed time period elapses (for example, each time thirty minutes elapses), stores the measured amount of power usage, and transmits the measured amount of power usage to the HEMS unit. For example, The HEMS unit may be connected to the energy meters via HAN/P1 port. Further, IEC (DLMS/COSEM) can be adopted as a protocol for communication between multiple meters and the HEMS unit.

The power grid may be an in-home or on-premises power grid that is electrically connected to a municipal power grid. The local power grid may provide electric power from the municipal power grid to on-premises appliances by way of, for example, electric outlets and the like. The municipal power grid may be operated by a utility service provider that provides electricity via the municipal power grid at a variable price in accordance with a power demand. For example, the utility service provider may charge a higher peak rate at times when there is higher power demand on the municipal power grid and a lower off-peak rate at times when there is a lower power demand on the municipal power grid. The municipal power grid may be configured to communicate utility related data, including rate information.

FIG. 5 shows steps executed by a computer readable media for a home energy management system according to an embodiment. An embodiment relates to a computer readable media 544 which is a non-transitory computer-readable medium comprising software application 548, having stored thereon instructions executable by a computer system 540 comprising a processor 542 to perform operations comprising: receiving, real-time energy information of energy consuming devices and energy producing devices from a communication gateway, wherein the energy consuming devices and the energy producing devices are electrically coupled to an energy management module 502; receiving, input energy data from a utility meter, using the communication gateway, wherein the energy management module is electrically coupled to the utility meter 504; determining, energy consumption data of the energy consuming devices and the energy producing devices from the energy information 506; identifying, a first device based on a first set of predefined priority values assigned to the energy consuming devices, wherein the first device requires energy 508; identifying, a second device based on a second set of predefined priority values assigned to the energy producing devices, wherein the second device has excess energy 510; establishing, a wireless connection between the first device and the second device using the communication gateway 512; and controlling, energy transfer from the second device to the first device based on instructions received from a mobile application, wherein the instructions are based on the energy consumption data and the input energy data to enable smart scheduling and power optimization among the energy consuming devices and the energy producing devices 514.

The HEMS may include suitable logic, circuitry, interfaces and/or code that may be configured to manage and transfer electric charge to the connected devices from the electric grid. The electric grid may be a managed network of high voltage (HV) power transmission lines, sub-stations, low voltage (LV) distribution lines, and generation facilities (such as power plants). The electric grid may be configured to deliver electric energy to a household through the HEMS. The electric grid may be configured to deliver the electric energy to the HEMS through various transmission and distribution lines. Examples of the electric grid may include, but are not limited to, a micro-grid, a national grid, a smart grid, and other electric energy generation facilities. In an embodiment, the electric grid device may be configured to communicate data or information (for example, related to a renewable energy certificate (REC)) to the HEMS unit for the purchase of the electric charge from the electric grid. The electric grid device may be a communication device, or an electronic device associated with the electric grid. Examples of the electric grid device may include, but are not limited to, a computing device, a mainframe machine, a computer workstation, a smartphone, a cellular phone, a mobile phone, and/or any electronic device with data processing and networking capabilities.

Figure 6A:
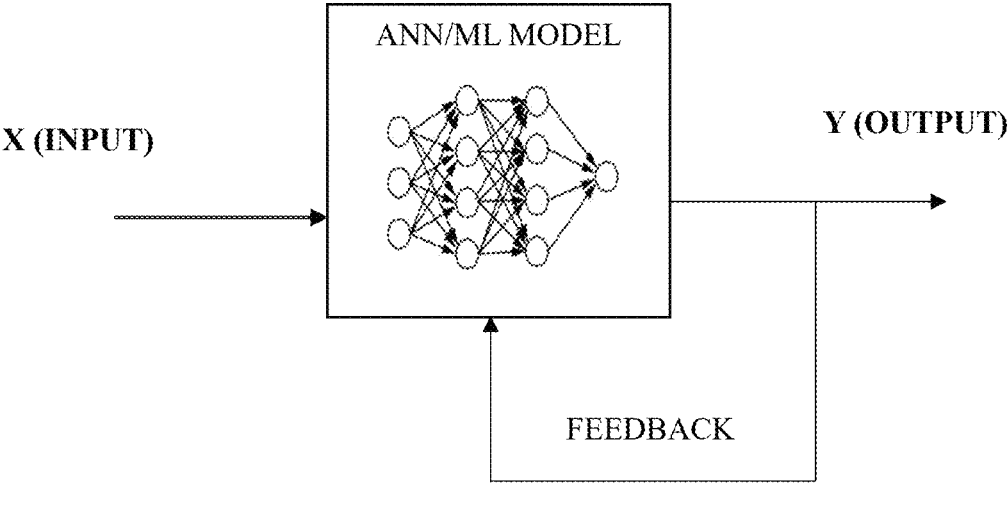
FIG. 6A shows a structure of the neural network/machine learning model with a feedback loop.

FIG. 6A shows a structure of the neural network/machine learning model with a feedback loop. Artificial neural networks (ANNs) model comprises an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed to the next layer of the network. A machine learning model or an ANN model may be trained on a set of data to take a request in the form of input data, make a prediction on that input data, and then provide a response. The model may learn from the data. Learning can be supervised learning and/or unsupervised learning and may be based on different scenarios and with different datasets. Supervised learning comprises logic using at least one of a decision tree, logistic regression, and support vector machines. Unsupervised learning comprises logic using at least one of a k-means clustering, a hierarchical clustering, a hidden Markov model, and an apriori algorithm. The output layer may predict a smart energy scheduling strategy and energy optimization strategy for the household based on the input data.

In an embodiment, ANNs may be a Deep-Neural Network (DNN), which is a multilayer tandem neural network comprising Artificial Neural Networks (ANN), Convolution Neural Networks (CNN) and Recurrent Neural Networks (RNN) that can recognize features from inputs, do an expert review, and perform actions that require predictions, creative thinking, and analytics. In an embodiment, ANNs may be Recurrent Neural Network (RNN), which is a type of Artificial Neural Networks (ANN), which uses sequential data or time series data. Deep learning algorithms are commonly used for ordinal or temporal problems, such as language translation, Natural Language Processing (NLP), speech recognition, and image recognition, etc. Like feedforward and convolutional neural networks (CNNs), recurrent neural networks utilize training data to learn. They are distinguished by their "memory" as they take information from prior input via a feedback loop to influence the current input and output. An output from the output layer in a neural network model is fed back to the model through the feedback. The variations of weights in the hidden layer(s) will be adjusted to fit the expected outputs better while training the model. This will allow the model to provide results with far fewer mistakes.

The neural network is featured with the feedback loop to adjust the system output dynamically as it learns from the new data. In machine learning, backpropagation and feedback loops are used to train an AI model and continuously improve it upon usage. As the incoming data that the model receives increases, there are more opportunities for the model to learn from the data. The feedback loops, or backpropagation algorithms, identify inconsistencies and feed the corrected information back into the model as an input.

Even though the AI/ML model is trained well, with large sets of labelled data and concepts, after a while, the models' performance may decline while adding new, unlabelled input due to many reasons which include, but not limited to, concept drift, recall precision degradation due to drifting away from true positives, and data drift over time. A feedback loop to the model keeps the AI results accurate and ensures that the model maintains its performance and improvement, even when new unlabelled data is assimilated. A feedback loop refers to the process by which an AI model's predicted output is reused to train new versions of the model.

Initially, when the AI/ML model is trained, a few labelled samples comprising both positive and negative examples of the concepts (for e.g., energy consumption patterns, dynamic tariff pricing, user defined preferences) are used that are meant for the model to learn. Afterward, the model is tested using unlabelled data. By using, for example, deep learning and neural networks, the model can then make predictions on whether the desired concept/s (for e.g., energy consumption patterns, dynamic tariff pricing, user defined preferences) are in unlabelled images. Each image is given a probability score where higher scores represent a higher level of confidence in the models' predictions. Where a model gives an image a high probability score, it is auto-labelled with the predicted concept. However, in the cases where the model returns a low probability score, this input may be sent to a controller (may be a human moderator) which verifies and, as necessary, corrects the result. The human moderator may be used only in exception cases. The feedback loop feeds labelled data, auto-labelled or controller-verified, back to the model dynamically and is used as training data so that the system can improve its predictions in real-time and dynamically.

Figure 6B:
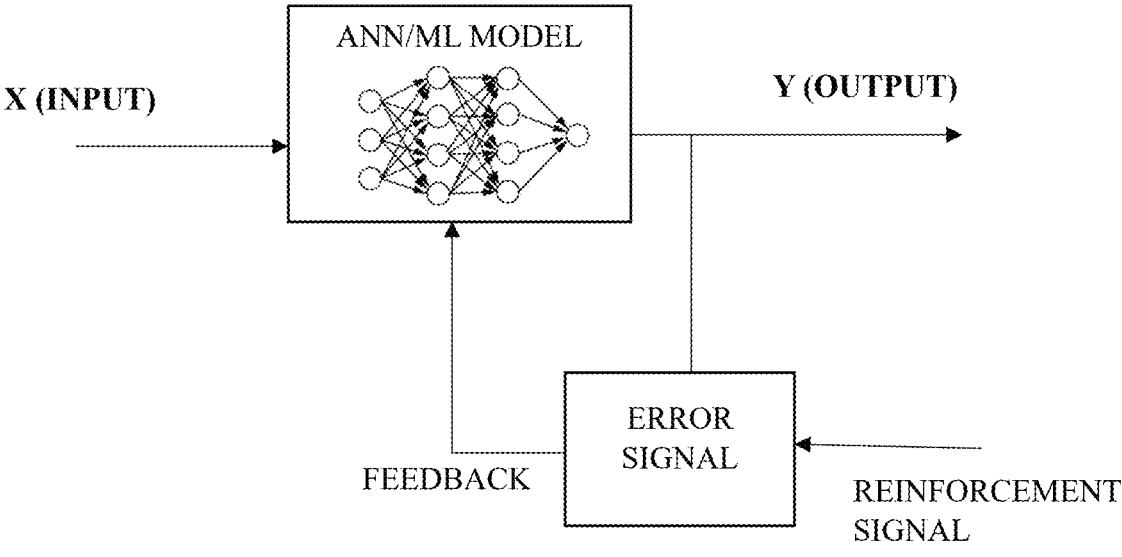
FIG. 6B shows a structure of the neural network/machine learning model with reinforcement learning.

FIG. 6B shows a structure of the neural network/machine learning model with reinforcement learning. The network receives feedback from authorized networked environments. Though the system is similar to supervised learning, the feedback obtained in this case is evaluative not instructive, which means there is no teacher as in supervised learning. After receiving the feedback, the network performs adjustments of the weights to get better predictions in the future. Machine learning techniques, like deep learning, allow models to take labelled training data and learn to recognize those concepts in subsequent data and images. The model may be fed with new data for testing, hence by feeding the model with data it has already predicted over, the training gets reinforced. If the machine learning model has a feedback loop, the learning is further reinforced with a reward for each true positive of the output of the system. Feedback loops ensure that AI results do not stagnate. By incorporating a feedback loop, the model output keeps improving dynamically and over usage/time.

According to an embodiment of the system the processor further comprises a machine learning model, wherein the processor is further configured to: train, the machine learning model with the energy information; receive, by the machine learning model, a new energy information; analyze, by the machine learning model, the new energy information to identify a pattern in energy information using a database; predict, by the machine learning model and based on the pattern, a smart scheduling strategy; and update the database with the new energy information; wherein the machine learning model is a self-learning model comprising a feedback layer that enables the machine learning model to learn from the new energy information and optimize the prediction of the energy scheduling strategy.

In an embodiment of the system, the machine learning model is configured to learn using labelled data using a supervised learning method, wherein the supervised learning method comprises logic using at least one of a decision tree, a logistic regression, a support vector machine, a k-nearest neighbors, a Naïve Bayes, a random forest, a linear regression, a polynomial regression, and a support vector machine for regression.

In an embodiment of the system, the machine learning model is configured to learn from real-time data using an unsupervised learning method, wherein the unsupervised learning method comprises logic using at least one of a k-means clustering, a hierarchical clustering, a hidden Markov model, and an apriori algorithm.

In an embodiment of the system, the machine learning model has a feedback loop, error signal in FIG. 6B, wherein output from a previous step is fed back to the model in real-time to improve performance and accuracy of the output of a next step.

In an embodiment of the system, the machine learning model comprises a recurrent neural network model.

In an embodiment of the system, the machine learning model has a feedback loop, wherein the learning is further reinforced with a reward for each true positive of the output of the system.

The HEMS unit 102 may also include strategies to learn energy generation properties of renewable energy source systems, such as the PV module and wind turbines, energy storage characteristics of the energy storage module, and dynamic price tariffs for the home energy generation system and battery storage system so that the energy generation system and energy storage can be operated and coordinated with usage of other appliances for the maximum benefit of the home owner and to achieve the goal of having a zero energy home capability as much as possible. For example, various implementations provide an optimal scheduling strategy for a household including a PV module, a storage module, an EVSE, a heat pump or HVAC unit, that is based on day-ahead weather prediction, day-ahead electricity pricing, and a learned energy consumption model of the house.

In a neural-network-learning-based approach, the model of the energy consumed by the devices connected to the HEMS unit may be obtained through a neural-network-based learning mechanism. The energy consumption model learned by the neural network may be updated, for example, daily. Hence, it can more accurately capture the energy production and energy consumption behaviour of a house at different seasons, users, weather conditions, etc. The neural network may be trained by using a backpropagation algorithm, which includes multiple iterations until a stop criterion is reached; thus, it is more computationally expensive. One neural network learning approach is a multilayer perceptron (MLP). An MLP is an artificial neural network structure and may be useful in modeling the house energy consumption, for example. An MLP includes a set of source nodes that make up the input layer, one or more layers of computation nodes, and an output layer. The input signal propagates through the network in a forward direction, on a layer-by-layer basis. The network exhibits a high degree of connectivity, determined by the weights of the network. Experiential knowledge for the network is acquired by the network through a learning process and stored in the network weights after it is trained.

In a regression-learning-based approach, the model of the energy consumed by the devices connected to the HEMS unit may be obtained through a regression-based learning mechanism. The regression model may also provide more accurate estimations of energy consumption that is close to the actual results, because the model is updated daily through the regression-based learning mechanism. With regard to the neural-network-based model, the regression-based learning is much faster because the parameters of the regression model can be solved directly. Regression models quantitatively describe the variability among the observations by partitioning an observation into two parts. The first part of this decomposition is the predicted portion having the characteristic that can be ascribed to all the observations considered as a group. The remaining portion, called the residual, is the difference between the observed value and the predicted value and has to be ascribed to unknown sources.

In an embodiment, computer based learning systems may be configured for formulating dynamic discount price tariffs associated with PV module power production and battery storage capability at different seasons, weather, and house conditions. Then, an optimal scheduling strategy is determined to operate the devices connected to the HEMS unit. Furthermore, the HEMS unit may also generate a control and management strategy for the battery for the next day based at least on a charge of the battery for the current day and an expected, or modelled, difference between next-day energy generation from at least one renewable energy generation source and energy consumption from at least one energy consuming device. The control and management strategy may include one or more time windows during which the battery is charged when energy generation is higher than energy demand or when energy from the battery is discharged for consumption by one or more energy consuming devices when energy generation is not occurring or is occurring at a level below a predetermined acceptable threshold.

In an embodiment, the HEMS unit 102 may use one of the following optimization approaches to solve the optimization problem: a nonlinear or linear programming approach and particle swarm technique. The optimization module for creating scheduling strategies for the connected devices may generate a scheduling strategy for each connected device that may be based on real-time energy pricing, acceptable price ranges, and/or time frames during which these energy consuming devices may be operated. The optimization module may use a binary integer programming technique to solve the optimization problem for the connected devices.

Using a scheduling strategy, the user may specify instead that a connected device may operate for an hour or less two times every other day, for example, but the user may not have a preference as to when it is operated so long as the price of electricity during operation is within a particular range set by the user. In an embodiment, the operation schedule and/or preferred pricing ranges may be input by or at the direction of the user. In other embodiments, the usage schedule may be set by another entity, such as the utility company, or set by the HEMS unit based on DTP, RTP, energy generated by renewable sources associated with the house, and/or expected usage of other energy consuming units in the house. The HEMS unit, may be further config- ured for using artificial neural networks (ANNs) and adap- tive dynamic programming (ADP) to control the connected devices, identifying when power should be released or stored by the battery by integrating real-time dynamic impedance measurements for battery charging/discharging algorithms, and coordinating usage of regulatable and defer- rable energy consuming units with PV and energy storage.

In an embodiment, the system may comprise a cyber security module.

In an embodiment, the system comprises a cyber security module wherein the cyber security module comprises an information security management module providing isola- tion between the communication module and servers.

In an embodiment, the information security management module is operable to, receive data from the communication module, exchange a security key at a start of the commu- nication between the communication module and the server, receive the security key from the server, authenticate an identity of the server by verifying the security key, analyze the security key for a potential cyber security threat, nego- tiate an encryption key between the communication module and the server, encrypt the data; and transmit the encrypted data to the server when no cyber security threat is detected.

In an embodiment, the information security management module is operable to exchange a security key at a start of the communication between the communication module and the server, receive the security key from the server, authen- ticate an identity of the server by verifying the security key, analyze the security key for a potential cyber security threat, negotiate an encryption key between the system and the server, receive encrypted data from the server, decrypt the encrypted data, perform an integrity check of the decrypted data and transmit the decrypted data to the communication module when no cyber security threat is detected.

In one aspect, a secure communication management (SCM) computer device for providing secure data connec- tions is provided. The SCM computer device includes a processor in communication with memory. The processor is programmed to receive, from a first device, a first data message. The first data message is in a standardized data format. The processor is also programmed to analyze the first data message for potential cyber security threats. If the determination is that the first data message does not contain a cyber security threat, the processor is further programmed to convert the first data message into a first data format associated with the HEMS environment and transmit the converted first data message to the HEMS system using a first communication protocol associated with the HEMS system.

According to an embodiment, secure authentication for data transmissions comprises, provisioning a hardware- based security engine (HSE) located in communications system, said HSE having been manufactured in a secure environment and certified in said secure environment as part of an approved network; performing asynchronous authen- tication, validation and encryption of data using said HSE, storing user permissions data and connection status data in an access control list used to define allowable data commu- nications paths of said approved network, enabling commu- nications of the communications system with other comput- ing system subjects to said access control list, performing asynchronous validation and encryption of data using secu- rity engine including identifying a user device (UD) that incorporates credentials embodied in hardware using a hard- ware-based module provisioned with one or more security aspects for securing the system, wherein security aspects comprising said hardware-based module communicating with a user of said user device and said HSE.

Figure 7A:
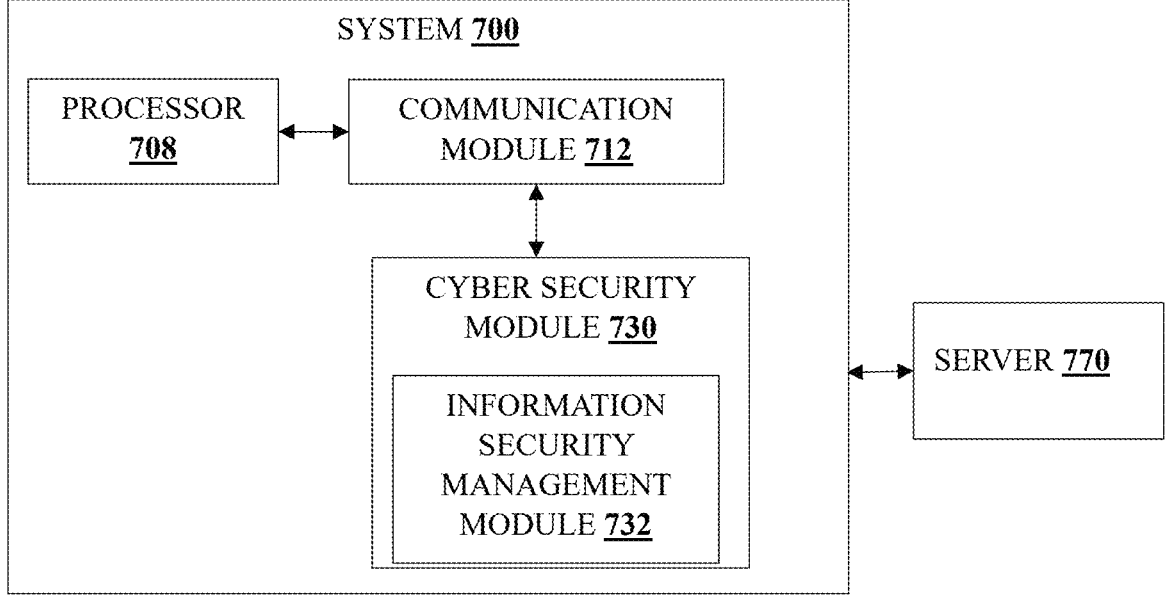
FIG. 7A shows a block diagram of the cyber security module in view of the system and server.

In an embodiment, FIG. 7A shows the block diagram of the cyber security module. The communication of data between the system 700 and the server 770 through the communication module 712, in communication with pro- cessor 708, is first verified by the information security management module 732 before being transmitted from the system to the server or from the server to the system. The information security management module is operable to analyze the data for potential cyber security threats, to encrypt the data when no cyber security threat is detected, and to transmit the data encrypted to the system or the server.

In an embodiment, the communication of energy infor- mation between the HEMS unit 102 and the energy con- suming devices and energy producing devices may be the data that is communicated by the communication module 712 through the cyber security module 730. The data may be first verified by the information security management mod- ule 732 of the cyber security module 730 to ensure integrity of the energy information data that is used to optimise the energy consumption of the household. The cyber security module provides confidentiality and integrity of the power usage data and the smart scheduling that is implemented in the household. The hardware and software handle the HEMS system from unauthorized data, data tampering, unauthor- ized modifications to the connected devices to avoid mal- functioning of the devices. The cyber security module also prevents processes from running if the instructions are not received from the intended user. The cyber security module 730 provides measures against falsification of energy infor- mation by a potential cyber attack by verifying the data from the communication module and ensuring the integrity of the communication gateway. The instructions received by the HEMS unit are authenticated and protected by encryption mechanisms by the cyber security module 730. The cyber security module 730 provides internal defense, attack intru- sion and detection, and measures against cyber and physical attacks on the HEMS system.

Figure 7B:
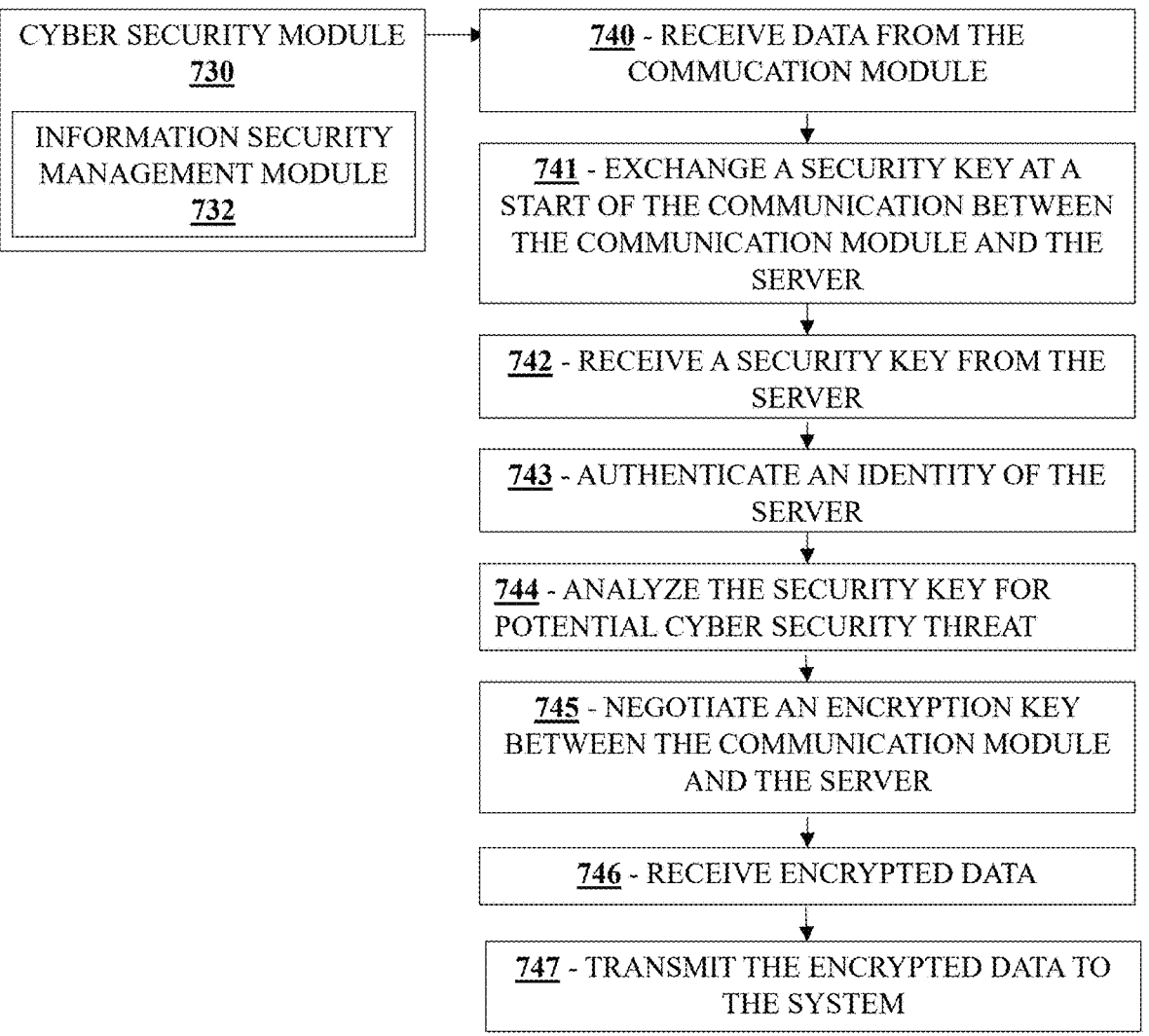
FIG. 7B shows an embodiment of the cyber security module.

In an embodiment, the cyber security module further comprises an information security management module pro- viding isolation between the system and the server. FIG. 7B shows the flowchart of securing the data through the cyber security module 730. At step 740, the information security management module is operable to receive data from the communication module. At step 741, the information secu- rity management module exchanges a security key at a start of the communication between the communication module and the server. At step 742, the information security man- agement module receives a security key from the server. At step 743, the information security management module authenticates an identity of the server by verifying the security key. At step 744, the information security management module analyzes the security key for potential cyber security threats. At step 745, the information security management module negotiates an encryption key between the communication module and the server. At step 746, the information security management module receives the encrypted data. At step 747, the information security management module transmits the encrypted data to the server when no cyber security threat is detected.

Figure 7C:
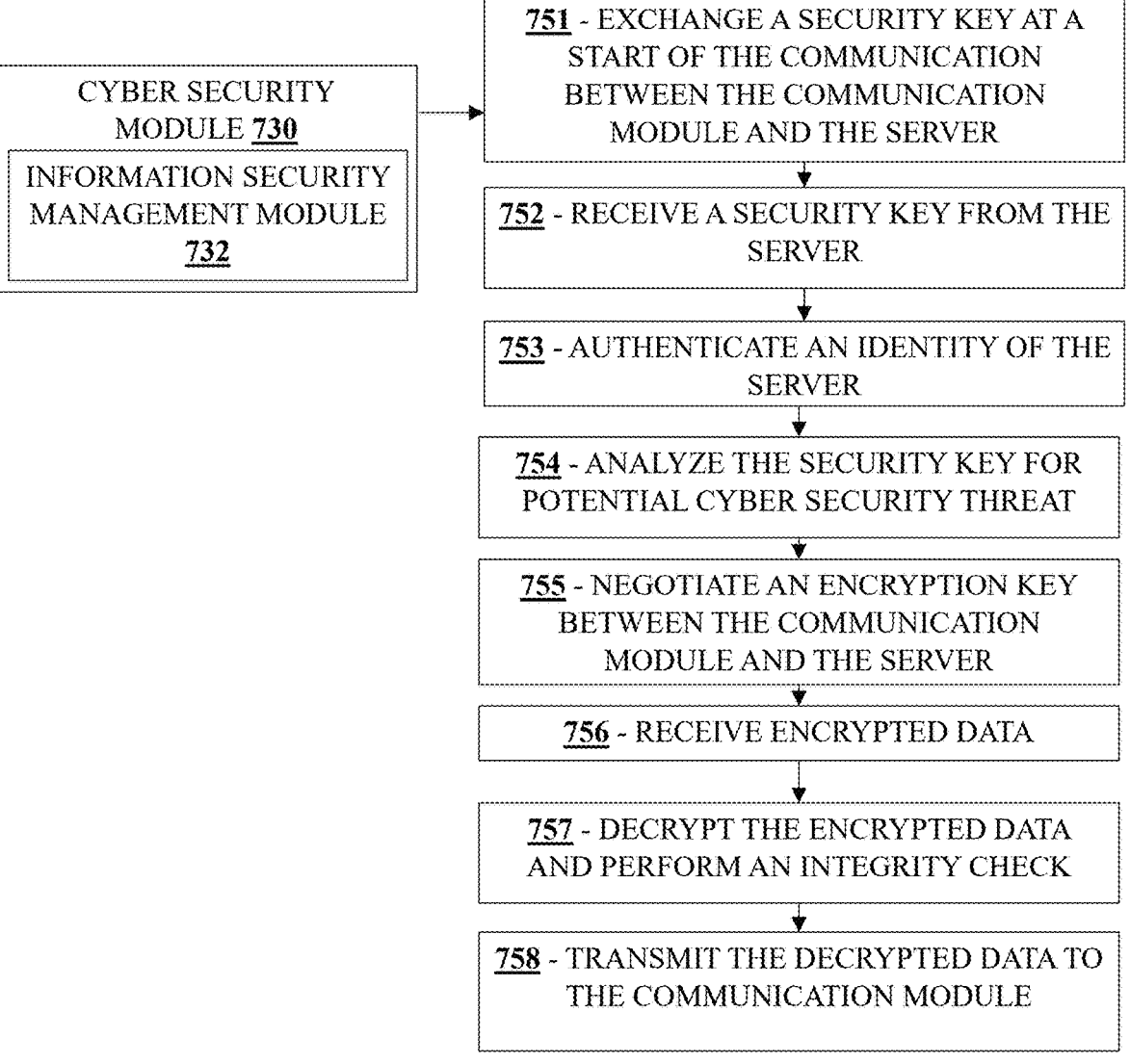
FIG. 7C shows another embodiment of the cyber security module.

In an embodiment, FIG. 7C shows the flowchart of securing the data through the cyber security module 730. At step 751, the information security management module 732 is operable to: exchange a security key at a start of the communication between the communication module and the server. At step 752, the information security management module receives a security key from the server. At step 753, the information security management module authenticates an identity of the server by verifying the security key. At step 754, the information security management module analyzes the security key for potential cyber security threats. At step 755, the information security management module negotiates an encryption key between the communication module and the server. At step 756, the information security management module receives encrypted data. At step 757, the information security management module decrypts the encrypted data, and performs an integrity check of the decrypted data. At step 758, the information security management module transmits the decrypted data to the communication module when no cyber security threat is detected.

In an embodiment, the integrity check is a hash-signature verification using a Secure Hash Algorithm 256 (SHA256) or a similar method.

In an embodiment, the information security management module is configured to perform asynchronous authentication and validation of the communication between the communication module and the server.

In an embodiment, the information security management module is configured to raise an alarm if a cyber security threat is detected. In an embodiment, the information security management module is configured to discard the encrypted data received if the integrity check of the encrypted data fails.

In an embodiment, the information security management module is configured to check the integrity of the decrypted data by checking accuracy, consistency, and any possible data loss during the communication through the communication module.

In an embodiment, the server is physically isolated from the system through the information security management module. When the system communicates with the server as shown in FIG. 7A, identity authentication is first carried out on the system and the server. The system is responsible for communicating/exchanging a public key of the system and a signature of the public key with the server. The public key of the system and the signature of the public key are sent to the information security management module. The information security management module decrypts the signature and verifies whether the decrypted public key is consistent with the received original public key or not. If the decrypted public key is verified, the identity authentication is passed. Similarly, the system and the server carry out identity authentication on the information security management module. After the identity authentication is passed on to the information security management module, the two communication parties, the system, and the server, negotiate an encryption key and an integrity check key for data communication of the two communication parties through the authenticated asymmetric key. A session ID number is transmitted in the identity authentication process, so that the key needs to be bound with the session ID number; when the system sends data to the outside, the information security gateway receives the data through the communication module, performs integrity authentication on the data, then encrypts the data through a negotiated secret key, and finally transmits the data to the server through the communication module. When the information security management module receives data through the communication module, the data is decrypted first, integrity verification is carried out on the data after decryption, and if verification is passed, the data is sent out through the communication module; otherwise, the data is discarded.

In an embodiment, the identity authentication is realized by adopting an asymmetric key with a signature.

In an embodiment, the signature is realized by a pair of asymmetric keys which are trusted by the information security management module and the system, wherein the private key is used for signing the identities of the two communication parties, and the public key is used for verifying that the identities of the two communication parties are signed. Signing identity comprises a public and a private key pair. In other words, signing identity is referred to as the common name of the certificates which are installed in the user's machine.

In an embodiment, both communication parties need to authenticate their own identities through a pair of asymmetric keys, and a task in charge of communication with the information security management module of the system is identified by a unique pair of asymmetric keys.

In an embodiment, the dynamic negotiation key is encrypted by adopting an Rivest-Shamir-Adleman (RSA) encryption algorithm. RSA is a public-key cryptosystem that is widely used for secure data transmission. The negotiated keys include a data encryption key and a data integrity check key.

In an embodiment, the data encryption method is a Triple Data Encryption Algorithm (3DES) encryption algorithm. The integrity check algorithm is a Hash-based Message Authentication Code (HMAC-MD5-128) algorithm. When data is output, the integrity check calculation is carried out on the data, the calculated Message Authentication Code (MAC) value is added with the header of the value data message, then the data (including the MAC of the header) is encrypted by using a 3DES algorithm, the header information of a security layer is added after the data is encrypted, and then the data is sent to the next layer for processing. In an embodiment the next layer refers to a transport layer in the Transmission Control Protocol/Internet Protocol (TCP/IP) model.

The information security management module ensures the safety, reliability, and confidentiality of the communication between the system and the server through the identity authentication when the communication between the two communication parties starts the data encryption and the data integrity authentication. The method is particularly suitable for an embedded platform which has less resources and is not connected with a Public Key Infrastructure (PKI) system and can ensure that the safety of the data on the server cannot be compromised by a hacker attack under the condition of the Internet by ensuring the safety and reliability of the communication between the system and the server.

The descriptions of the one or more embodiments are for purposes of illustration but are not exhaustive or limiting to the embodiments described herein. Many modifications and variations will be apparent to those of ordinary skill in the art without departing from the scope and spirit of the described embodiments. The terminology used herein best explains the principles of the embodiments, the practical application and/or technical improvement over technologies found in the marketplace, and/or to enable others of ordinary skill in the art to understand the embodiments described herein.

What is claimed is:

1. A system comprising:

an energy management module, wherein the energy management module is electrically coupled to a utility meter;

energy consuming devices and energy producing devices electrically coupled to the energy management module, the energy management module comprising:

a communication gateway communicatively coupled to the utility meter, the energy consuming devices, and the energy producing devices;

a communication module configured to receive from the communication gateway, input energy data from the utility meter, and energy information of the energy consuming devices and the energy producing devices;

a processor storing instructions in a non-transitory memory that, when executed, cause the processor to:

determine energy consumption data of the energy consuming devices and the energy producing devices from the energy information;

identify a first device based on a first set of predefined priority values assigned to the energy consuming devices, wherein the first device requires energy;

identify a second device based on a second set of predefined priority values assigned to the energy producing devices, wherein the second device has excess energy;

establish a wireless connection between the first device and the second device using the communication gateway; and control energy transfer from the second device to the first device based on instructions received by the communication module from an application, wherein the instructions received by the communication module are based on the energy consumption data and the input energy data to enable smart scheduling and power optimization among the energy consuming devices and the energy producing devices.

2. The system of claim 1, wherein the energy consuming devices comprises one or more of a home appliance, an electric vehicle, a battery storage device, and a heating system.

3. The system of claim 1, wherein the energy producing devices comprises one or more of a photovoltaic system, an electric vehicle, an electric vehicle supply equipment (EVSE), a battery storage device, and a generator.

4. The system of claim 1, wherein the first set of predefined priority values is based on one or more of a residual energy, an urgent energy need, a user preference, and a user defined schedule.

5. The system of claim 1, wherein the second set of predefined priority values is based on one or more of a time of day, an excess energy, a user preference, and an energy price data.

6. The system of claim 1, wherein the energy information further comprises one or more of an energy transfer data, an energy price data, an energy monitoring data, a peak wattage, a peak input current, an energy outage data, and an energy consumption pattern.

7. The system of claim 1, wherein the energy consumption data of the first device comprises one or more of an amount of energy required by the first device, a characteristic of the first device, and an energy consumption pattern.

8. The system of claim 1, wherein the energy transfer is determined based on one or more of a state of charge of the first device, a state of charge of the second device, a discharge rate of the second device, a first threshold value of the first device, and a second threshold value of the second device.

9. The system of claim 1, wherein the smart scheduling comprises one or more of a temporal scheduling, a preemptive scheduling, a cooperative scheduling, and a dynamic priority scheduling.

10. The system of claim 1, wherein the application comprises a mobile application.

11. The system of claim 1, wherein the communication module communicates with the first device over a first communication protocol and communicates with the second device over a second communication protocol.

12. The system of claim 1, wherein the communication module is further configured to:

receive the input energy data and the energy information at regular intervals;

aggregate the input energy data and the energy information; and transmit the input energy data and the energy information for storage to one or more of a cloud server and a local storage.

13. The system of claim 1, wherein the communication module is configured to receive the energy information of the energy consuming devices and the energy producing devices in real-time.

14. The system of claim 1, wherein the smart scheduling is based on one or more of a time of use, a dynamic input energy price, a dynamic output energy price, a critical peak price, an energy consumption pattern, a user goal, a geographic location, and a user preference.

15. The system of claim 1, wherein the energy management module is electrically coupled to the utility meter using a HAN port or a P1 port.

16. The system of claim 1, wherein the processor further comprises a machine learning model, wherein the processor is further configured to:

train, the machine learning model with the energy information, wherein the energy information is first energy information;

receive, by the machine learning model, a new energy information;

analyze, by the machine learning model, the new energy information to identify a pattern in the first energy information using a database;

predict, by the machine learning model and based on the pattern, a smart scheduling strategy; and update the database with the new energy information;

wherein the machine learning model is a self-learning model comprising a feed-back layer that enables the machine learning model to learn from the new energy information and optimize the prediction of the energy scheduling strategy.

17. A method comprising:

receiving, real-time energy information of energy consuming devices and energy producing devices, using a communication gateway of a communication module, wherein the energy consuming devices and the energy producing devices are electrically coupled to an energy management module;

receiving, input energy data from a utility meter, using the communication gateway, wherein the energy management module is electrically coupled to the utility meter;

determining, energy consumption data of the energy consuming devices and the energy producing devices from the energy information;

identifying, a first device based on a first set of predefined priority values assigned to the energy consuming devices, wherein the first device requires energy;

identifying, a second device based on a second set of predefined priority values assigned to the energy producing devices, wherein the second device has excess energy;

establishing, a wireless connection between the first device and the second device using the communication gateway; and controlling, energy transfer from the second device to the first device based on instructions received by the communication module from an application, wherein the instructions received by the communication module are based on the energy consumption data and the input energy data to enable smart scheduling and power optimization among the energy consuming devices and the energy producing devices.

18. The method of claim 17, wherein the energy transfer is determined based on one or more of a state of charge of the first device, a state of charge of the second device, a discharge rate of the second device, a first threshold value of the first device, and a second threshold value of the second device.

19. The method of claim 17, further comprising:

receiving, the input energy data and the energy information at regular intervals;

aggregating, the input energy data and the energy information; and transmitting, the input energy data and the energy information for storage to one or more of a cloud server and a local storage.

20. A non-transitory computer-readable medium having stored thereon instructions executable by a computer system to perform operations comprising:

receiving, real-time energy information of energy consuming devices and energy producing devices from a communication gateway, wherein the energy consuming devices and the energy producing devices are electrically coupled to an energy management module;

receiving, input energy data from a utility meter, using the communication gateway, wherein the energy management module is electrically coupled to the utility meter;

determining, energy consumption data of the energy consuming devices and the energy producing devices from the energy information;

identifying, a first device based on a first set of predefined priority values assigned to the energy consuming devices, wherein the first device requires energy;

identifying, a second device based on a second set of predefined priority values assigned to the energy producing devices, wherein the second device has excess energy;

establishing, a wireless connection between the first device and the second device using the communication gateway; and controlling, energy transfer from the second device to the first device based on instructions received by a communication module from a mobile application, wherein the instructions received by the communication module are based on the energy consumption data and the input energy data to enable smart scheduling and power optimization among the energy consuming devices and the energy producing devices.

* * * * *